US011309756B2

(12) United States Patent
Kim et al.

(10) Patent No.: US 11,309,756 B2
(45) Date of Patent: Apr. 19, 2022

(54) MOTOR

(71) Applicant: LG Magna e-Powertrain Co., Ltd., Incheon (KR)

(72) Inventors: Kyeonghwan Kim, Seoul (KR); Wonjung Sung, Seoul (KR); Gyeongjae Park, Seoul (KR); Hojun Shin, Seoul (KR); Junho Ahn, Seoul (KR); Yangsoo Lee, Seoul (KR); Jongsu Kim, Seoul (KR)

(73) Assignee: LG MAGNA E-POWERTRAIN CO., LTD., Incheon (KR)

( * ) Notice: Subject to any disclaimer, the term of this patent is extended or adjusted under 35 U.S.C. 154(b) by 196 days.

(21) Appl. No.: 16/718,397

(22) Filed: Dec. 18, 2019

(65) Prior Publication Data

US 2020/0204021 A1 Jun. 25, 2020

(30) Foreign Application Priority Data

Dec. 19, 2018 (KR) .................. 10-2018-0165458
Feb. 25, 2019 (KR) .................. 10-2019-0021981

(51) Int. Cl.
*H02K 1/32* (2006.01)
*H02K 1/27* (2006.01)
*H02K 5/20* (2006.01)
*H02K 7/08* (2006.01)
*H02K 9/193* (2006.01)
*H02K 21/16* (2006.01)
*H02K 1/276* (2022.01)

(52) U.S. Cl.
CPC ............. *H02K 1/32* (2013.01); *H02K 1/276* (2013.01); *H02K 5/20* (2013.01); *H02K 7/083* (2013.01); *H02K 9/193* (2013.01); *H02K 21/16* (2013.01); *H02K 2201/03* (2013.01)

(58) Field of Classification Search
CPC ............ H02K 1/32; H02K 5/20; H02K 9/193; H02K 21/22
USPC ....................................... 310/54, 58–59, 61
See application file for complete search history.

(56) References Cited

U.S. PATENT DOCUMENTS 3,987,324 A * 10/1976 Linkous ............. B22D 19/0054
310/197
5,519,269 A 5/1996 Lindberg
(Continued)

FOREIGN PATENT DOCUMENTS

CN 206149098 5/2017
DE 112014007108 T5 7/2017
(Continued)

OTHER PUBLICATIONS

European Search Report dated Apr. 28, 2020.

*Primary Examiner* — Jose A Gonzalez Quinones
(74) *Attorney, Agent, or Firm* — Birch, Stewart, Kolasch & Birch, LLP

(57) ABSTRACT

A motor includes a rotor assembly and a stator. The rotor assembly includes a rotatable shaft extending in an axial direction, a rotor core coupled to the rotatable shaft and having a plurality of holes penetrating through the rotor core in the axial direction, a first end ring coupled to one end of the rotor core and configured to guide oil supplied to the rotor assembly into the plurality of holes, and a second end ring coupled to the opposite end of the rotor core and configured to guide oil passing through the plurality of holes in a radial direction.

18 Claims, 19 Drawing Sheets

(56) References Cited

U.S. PATENT DOCUMENTS

| | | | |
|---|---|---|---|
| 9,644,628 B2 | 5/2017 | Yamashita et al. | |
| 2014/0042841 A1* | 2/2014 | Rippel | H02K 1/20 |
| | | | 310/54 |
| 2015/0303774 A1* | 10/2015 | Kitta | H02K 9/10 |
| | | | 310/54 |
| 2017/0271958 A1* | 9/2017 | Kitta | H02K 9/19 |

FOREIGN PATENT DOCUMENTS

| | | |
|---|---|---|
| EP | 2562914 A1 | 2/2013 |
| JP | 2008-219960 | 9/2008 |
| JP | 2013 055775 A | 3/2013 |

* cited by examiner

MOTOR

CROSS-REFERENCE TO RELATED APPLICATIONS

Pursuant to 35 U.S.C. § 119(a), this application claims the benefit of earlier filing date and right of priority to Korean Application No. 10-2018-0165458, filed on Dec. 19, 2018, and Korean Application No. 10-2019-0021981, filed on Feb. 25, 2019, the contents of which are incorporated by reference herein in its entirety.

BACKGROUND OF THE DISCLOSURE

Field of the Disclosure

The present disclosure relates to a motor, and particularly, to a motor mounted in a vehicle and cooled by using oil.

Background of the Disclosure

In general, a motor refers to a machine that includes a stator and a rotor provided to be rotatable with respect to the stator and converts electrical energy into mechanical energy. Such motors have been utilized in various fields but have recently been spotlighted as driving sources of electric vehicles replacing internal combustion engines or hybrid vehicles mounted with internal combustion engines.

When a motor is used as a driving source of a vehicle, the motor requires a considerable output, thereby increasing the amount of heat generated by the driving. Heat generated by the driving of the motor may cause irreversible demagnetization of the permanent magnet embedded in the rotor. In addition, since efficiency of the motor may be lowered or damaged due to overheating of the motor, the motor must be cooled.

As a method of cooling the motor, an air-cooling method using air, a water-cooling method using water, and an oil-cooling method using oil may be proposed. However, the air-cooling method is not sufficient to cool the heat generated by thrust of the motor used as a driving source for driving a vehicle, so that the motor is cooled by the water-cooling or oil-cooling method.

Related art 1 [U.S. Pat. No. 9,644,628 B2] discloses a technique for cooling a motor for driving a scroll compressor using oil, and related art 2 [Chinese Utility Model No. CN 206149098 U] discloses a technique for cooling a motor using oil.

In the documents 1 and 2 of the related art, oil is transmitted in an axial direction through a hollow portion formed on a rotating shaft for transmitting a rotational force of the motor to an orbiting scroll. Here, the oil is transferred to the rotor using a radially formed hole connected to the hollow portion and cools the rotor.

One of main heating sources of the motor is a magnetic member such as a permanent magnet embedded in the rotor, but according to the structure of the documents 1 and 2 of the related art, there is a problem that it is difficult to deliver a sufficient amount of oil transferred through the hole to cool an internal structure such as a magnetic member.

Related art 3 [U.S. Pat. No. 5,519,269 B2] discloses a technique for cooling a motor while making oil flow in an axial direction. However, according to related art 3, an axial flow of oil is limited to a stator, and no axial flow occurs inside the rotor. Accordingly, a problem arises in that it is difficult to sufficiently cool an internal structure such as a magnetic member.

Meanwhile, with respect to the oil-cooling type motor of the related art as described above, FIG. 1 is a cross-sectional view of the oil-cooling type motor of the related art.

As shown in FIG. 1, in the case of the oil-cooling type motor 10 of the related art, a height of an oil 17 filled inside the motor 10 is higher than an air gap 15 formed between a stator core 11 and a rotor core 13, so the oil 17 for cooling the air gap 15 may be supplied to the air gap 15 even during rotation of the rotor core 13.

However, in the oil-cooling type motor 10 of the related art as described above, since the oil is filled inside the motor 10 to a position higher than the air gap 15, the amount of oil is large, so that driving efficiency of the motor 10 is lowered due to oil drag torque when the rotor core 13 rotates.

RELATED ART DOCUMENT

Patent Document (Patent document 1) U.S. Pat. No. 9,644,628 B2 (2017 May 9)

(Patent document 2) Chinese Utility Model No. CN 206149098 U (2017 May 3)

(Patent document 3) U.S. Pat. No. 5,519,269 B2 (1996 May 21)

SUMMARY OF THE DISCLOSURE

Therefore, an aspect of the detailed description is to provide a structure of a motor which is cooled by using oil and has cooling performance improved by sufficiently supplying oil to a rotor and a stator.

Another aspect of the detailed description is to provide a structure of a motor in which cooling efficiency of a rotor assembly may be improved by oil by introducing oil into a rotor.

Another aspect of the detailed description is to provide a structure of a motor which improves cooling performance by accelerating an axial flow of oil in a rotor assembly.

Another aspect of the detailed description is to provide a structure capable of cooling an end turn of a coil wound around a stator by scattering at least a portion of oil supplied to a rotor.

Another aspect of the detailed description is to provide a structure of a motor in which oil flows to an air gap between a stator and a rotor, thereby preventing a degradation of heat dissipation performance due to air filled in the air gap.

Another aspect of the detailed description is to provide a structure of a motor in which oil flowing into a rotor moves both in a radial direction and in an axial direction to improve cooling performance of the rotor.

To achieve these and other advantages and in accordance with the purpose of this specification, as embodied and broadly described herein, a motor includes a rotor assembly including a rotor core and a rotating shaft and includes a plurality of holes axially penetrated inside the rotor core, and oil for cooling the rotor assembly may be supplied to the plurality of holes. According to such a structure, the rotor core is cooled by the oil to reduce a temperature of the rotor core.

The motor according to the present disclosure may include a casing, a stator fixed to an inner circumferential surface of the casing, and the rotor assembly coupled to the stator with a predetermined air gap therebetween and provided to be rotatable according to a magnetic interaction with the stator.

The rotor assembly may include a rotating shaft formed to extend in one direction and a rotor core coupled to the rotating shaft and having a plurality of holes penetrated in one direction.

Here, the rotor assembly may include a first end ring coupled to one end of the rotor core and having a first oil guiding surface configured to guide oil supplied to the rotor assembly to the plurality of holes.

In this case, oil supplied to the rotor assembly flows in the radial direction along the first oil guiding surface of the first end ring so as to be guided to the plurality of holes and supplied to the inside of the rotor to cool the inside of the rotor.

In addition, the first oil guiding surface may be formed to be spaced apart from the plurality of holes in a facing manner. In addition, the first oil guiding surface may extend in a direction perpendicular to the axial direction of the rotating shaft.

Here, the oil flowing into the plurality of holes may be continuously supplied to the first end ring to move in a radial direction and flow into the plurality of holes, thereby generating a feed force in a direction from the first end ring toward the second end ring. Accordingly, the axial movement of the oil may be accelerated.

In addition, the rotor assembly may include a second end ring coupled to the other end of the rotor core and having a second oil guiding surface for radially guiding oil passing through the plurality of holes.

Further, the second oil guiding surface may be formed to be spaced apart from the plurality of holes in a facing manner. In addition, the second oil guiding surface may extend in a direction perpendicular to the axial direction of the rotating shaft. Accordingly, the second end ring scatters the oil in the radial direction. Accordingly, a suction force is generated in the plurality of holes in a direction from the first end ring toward the second end ring. Accordingly, axial movement of the oil staying in the plurality of holes may be further accelerated.

In addition, according to the present disclosure, the plurality of holes may include a first hole formed adjacent to the rotating shaft and a second hole accommodating a magnetic member and spaced apart from the first hole in a radial direction. In other words, the second hole may be formed radially outward of the first hole.

The first hole may be a recess for reducing a weight of the rotor core, and the second hole may be a recess for accommodating a magnetic member such as a permanent magnet.

In this case, the first oil guiding surface may include a first guiding surface formed to face the first hole to guide the oil to the first hole. In addition, the first oil guiding surface may include a second guiding surface formed to extend radially from the first guiding surface to guide the oil to the second hole.

By the oil flowing into the first hole and the second hole, it is possible to quickly cool heat generated by the magnetic member. As a result, a phenomenon of a magnet demagnetization of the magnetic member may be reduced, so that performance of the motor may be maintained for a long time.

Further, according to the present disclosure, the first guiding surface may be further spaced apart in the axial direction from one surface of the rotor core than the second guiding surface, and the first guiding surface and the second guiding surface may be connected by a third guiding surface formed to be inclined with respect to the axial direction. Oil may be appropriately distributed to the first hole and the second hole by the third guiding surface which is formed to be inclined.

In addition, according to the present disclosure, the second end ring may include a blade protruding from the second oil guiding surface toward the rotor core. The oil supplied to the second oil guiding surface may be pushed in the radial direction by the blade, thereby accelerating the radial movement of the oil. Accordingly, a negative pressure may be formed in the plurality of holes.

Here, the blade may be formed to extend in the radial direction of the second end ring.

In addition, the blade may extend in a direction opposite to a rotation direction of the rotor assembly toward the radially outward from the center of the second end ring.

In addition, the casing of the motor according to the present disclosure may include a main housing accommodating the stator and the rotor assembly, a first cover covering one end of the main housing and supporting one side of the rotor assembly, and a second cover covering the other end of the main housing and supporting the other side of the rotor assembly. That is, the main housing may have a cylindrical shape in which a predetermined space is formed therein and one end and the other end are open.

In addition, the motor according to the present disclosure may include an oil circulation module which is configured to supply oil into the casing of the motor and recover the supplied oil. The main housing may have an oil inlet formed to penetrate through one surface of the main housing to allow oil to flow therein.

Here, the oil inlet may be formed to overlap the rotor assembly in a gravity direction so that the oil is dropped and supplied to the rotor assembly. That is, the oil inlet may be formed to penetrate through the main housing at an upper portion of the rotor assembly. In other words, the oil inlet may be formed at an upper portion of the rotor assembly such that the oil is dropped and supplied to the rotor assembly.

The first cover may include an oil guide protrusion protruding from one surface facing the rotor core toward the first end ring to guide the oil dropped from an upper side with respect to the gravity direction to the first oil guiding surface.

Here, the oil inlet may be formed to overlap the oil guide protrusion in the gravity direction. That is, the oil introduced by the oil inlet may fall toward the oil guide protrusion.

In addition, the oil guide protrusion may overlap the first end ring in a radial direction of the rotating shaft, and the first oil guiding surface may be formed on the radially outer side of the oil guide protrusion. The oil may be guided to the first end ring by the oil guide protrusion.

In addition, the first cover may include a first shaft receiving portion protruding from one surface facing the rotor assembly to form a first rotating shaft accommodating space accommodating at least a portion of one side of the rotating shaft and a first bearing member provided in the first rotating shaft accommodating space and supporting in a radial direction on one side of the rotating shaft.

Here, a first oil inlet hole may be formed to penetrate through the first shaft receiving portion at an upper portion of the first shaft receiving portion with respect to the rotating shaft. At least part of the oil dropped from the upper portion of the first shaft receiving portion may flow into the first rotating shaft accommodating space through the first oil inlet hole. Accordingly, the bearing member may maintain lubrication continuously by the oil.

Here, the oil inlet protrusion may protrude from an end surface of the first shaft receiving portion. Accordingly, the oil flowing into the first rotating shaft accommodating space may be guided to the first oil guiding surface.

In addition, the oil guide protrusion may include a first oil guide protrusion formed to be inclined to an upper side with respect to the rotating shaft to guide at least a portion of the dropped oil to the first end ring and a second oil protrusion formed to surround at least a portion of the rotor on a lower side of the rotating shaft to guide the other part of the dropped oil to the first end ring.

In addition, the first shaft receiving portion may include a first oil reservoir surface formed concave on one surface facing the oil inlet of the first shaft receiving portion. Here, the first oil inlet hole may be formed at the first oil reservoir surface.

That is, the oil dropped to the first shaft receiving portion may not directly flow to the lower side of the rotor assembly but remain at the first oil reservoir surface and flow in through the first oil inlet hole. Accordingly, utilization of the oil circulated inside the casing may be increased.

In addition, the first oil reservoir surface may be formed to extend to the first oil guide protrusion to guide the oil to the first oil guiding surface. In this case, at least part of the oil guided to the first oil guiding surface through the first oil guide protrusion may be supplied to the other surface opposite to one surface of the first end ring facing the rotor assembly.

In addition, the second oil guide protrusion may have an inclined surface formed to be inclined with respect to the axial direction, so that the oil flowing into the first rotating shaft accommodating space and moving to the plurality of holes may be smoothly guided.

In addition, according to the present disclosure, the stator includes a stator core coupled to an inner circumferential surface of the main housing; and a winding coil portion wound around the stator core and including first and second end turns protruding from one surface and the other surface of the stator core.

Here, the second oil guiding surface may overlap the second end turn in a radial direction of the rotating shaft. In this case, oil scattered in the radial direction may be supplied to the second end turn by the second oil guiding surface. This makes it possible to cool heat of the second end turn.

In addition, the first end ring may include a first scattering portion formed to scatter oil supplied to the other surface opposite to one surface of the first end ring facing the rotor assembly in a radial direction.

Here, the first scattering portion may overlap the first end turn in the radial direction of the rotating shaft. In this case, the oil scattered in the radial direction may be supplied to the first end turn by the first scattering portion. This makes it possible to cool heat of the first end turn.

In addition, the first scattering portion may include a first edge portion protruding from the other surface and extending along a circumferential direction from an edge of the first end ring and a first slit portion recessed from the first edge portion in the axial direction and provided in plurality along a circumference direction. The oil may be evenly supplied in a circumferential direction of the first end turn by the first scattering portion having such a structure.

In addition, particles of scattered oil may be atomized and collide with the first end turn. As a result, at least part of the oil may temporarily absorb heat, while floating in an inner space of the casing. Accordingly, overall cooling performance of the motor may be improved.

In addition, the second cover may include a second shaft receiving portion protruding from one surface facing the rotor assembly to form a second rotating shaft accommodating space accommodating at least a portion of the other side of the rotating shaft and first and second bearing members provided in the second rotating shaft accommodating space and supporting in the radial direction on one side of the rotating shaft.

Here, a second oil inlet hole may be formed at an upper portion of the second shaft receiving portion with respect to the rotating shaft to penetrate through the second shaft receiving portion so that at least a portion of the dropped oil flows into the second rotating shaft accommodating space.

In addition, the second rotating shaft accommodating space may face the other surface opposite to one surface of the second end ring facing the rotor assembly. Accordingly, the oil flowing into the second rotating shaft accommodating space may be in contact with the other surface of the second end ring opposite to one surface facing the rotor assembly.

The second end ring may include a second scattering portion formed to scatter at least part of the oil supplied to the other surface of the second end ring in the radial direction through the second rotating shaft accommodating space. The oil in contact with the other surface may be scattered, while moving in the radial direction according to the rotation of the rotor assembly, by the second scattering portion.

Here, the second scattering portion may be provided to overlap the second end turn in the radial direction of the rotating shaft. In this case, the oil scattered in the radial direction by the second scattering portion may be supplied to the second end turn. This makes it possible to cool heat of the second end turn.

In addition, the second scattering portion may include a second edge portion protruding from the other surface and extending along a circumferential direction from an edge of the second end ring and a second slit portion recessed from the second edge portion in the axial direction and provided in plurality along a circumference direction. The oil may be evenly supplied in the circumferential direction of the second end turn by the second scattering portion having such a structure.

Meanwhile, in the motor according to another aspect of the present disclosure, the oil may be flowing into the air gap after passing through the inside of the rotor core.

Specifically, the oil induced by the first end ring may flow into the air gap by the second end ring after passing through an oil passage hole of the rotor core, thereby cooling the inside of the rotor core and the air gap.

A motor having a motor air gap cooling structure including a casing, a stator core provided in the casing, a rotor core relatively moving with respect to the stator core, and an air gap formed between the stator core and the rotor core, wherein an oil movement hole is formed at the rotor core so as to penetrate in an axial direction, a first end ring having a first oil guiding portion guiding oil toward the oil movement hole along an inner circumferential surface is provided on one side of the rotor core, and a second end ring having a second oil guiding portion guiding the oil passing through the oil movement hole along the inner circumferential surface toward the air gap is provided on the other side of the rotor core.

In addition, the first oil guiding portion may be formed to be rounded or inclined toward the oil movement hole.

In addition, the second oil guiding portion may be formed to be rounded or inclined toward the air gap.

In addition, at least a portion of the second oil guiding portion may be positioned to face the air gap.

In addition, a movement limiting portion may be provided on one surface of the rotor core facing the second end ring in order to limit movement of the oil moving to the second end ring after passing through the oil movement hole, in the opposite direction of the second oil guiding portion.

In addition, the movement limiting portion may include a protrusion protruding from one surface of the rotor core toward the second end ring and limiting the oil from moving in the opposite direction of the second oil guiding portion; and a guiding portion extending from one end of the protrusion toward the second oil guiding portion to guide movement of the oil toward the second oil guiding portion.

In addition, an inclined portion may be provided at one end of the guiding portion and inclined toward the air gap.

In addition, at least one movement accelerating portion may be provided on an external circumferential surface of the rotor core to accelerate movement of the oil passing through the air gap in the axial direction of the rotor core.

In addition, the movement accelerating portion may have a slot shape.

In addition, the movement accelerating portion may be formed to be inclined with respect to the axial direction of the rotor core.

In addition, the end portion of the second oil guiding portion and the rotor core are positioned to be spaced apart from each other.

In addition, a distance between the end portion of the second oil guiding portion and the rotor core may be equal to or less than a width of the air gap.

As described above, according to an embodiment of the present disclosure, as the oil supplied to the rotor assembly is guided to the inside of the rotor core by the first end ring, a contact area between the oil and the rotor may increase. As a result, a heat transfer rate at which heat generated by the rotor assembly is transferred to oil is increased to increase a cooling effect.

In addition, oil is supplied into the rotor and flows through the plurality of holes, and as the axial flow of oil in the plurality of holes is accelerated by the second end ring, a greater amount of oil may be in contact with the rotor, thus improving cooling performance.

Furthermore, as the oil supplied to the inside of the rotor flows through the plurality of holes and is in direct contact with the magnetic member to cool the magnetic member, a temperature of the magnetic member may be reduced. As a result, demagnetization of the magnetic member may be prevented.

In addition, at least part of the oil supplied to the rotor assembly may be supplied to the bearing member supporting the rotating shaft, thereby not only cooling heat generated in the bearing member but also supplying the oil to lubricate the bearing member.

In addition, the oil dropped and supplied to the first shaft receiving portion may be guided to the first end ring by the oil guide protrusion. Accordingly, the amount of oil flowing directly to the lower side of the motor without flowing into the rotor assembly may be reduced.

In addition, since at least part of the oil supplied to the rotor assembly is scattered by the scattering portion, it is possible to cool the end turns of the coil in which the end turns are arranged to overlap each other in the radial direction.

In addition, since particles of the scattered oil collide with the end turn and atomized, at least part of the oil may absorb heat, while temporarily floating in the inner space of the casing. Accordingly, overall cooling performance of the motor may be improved.

In addition, since the first oil guiding portion is formed on the inner circumferential surface of the first end ring, the second oil guiding portion is formed on the inner circumferential surface of the second end ring, and the oil movement hole is formed at the rotor core, the oil filled in the casing through the first oil guiding portion, the second oil guiding portion, and the oil movement hole flows to the air gap to cool the air gap.

In addition, since oil flows into the air gap through the first oil guiding portion, the second oil guiding portion, and the oil movement hole to cool the air gap, a height of the oil filled inside the casing needs not be higher than the air gap, thereby minimizing an influence of ab oil drag torque by the oil during rotation of the rotor core.

In addition, the first oil guiding portion or the second oil guiding portion is formed to be inclined or rounded, so that the oil flows smoothly toward the rotor core through the first oil guiding portion and, at the same time, the oil flows smoothly toward the air gap through the second oil guiding portion.

In addition, by positioning at least a portion of the second oil guiding portion to face the air gap, the second oil guiding portion is prevented from being positioned lower than the air gap so that the amount of oil discharged without flowing toward the air gap in the oil passing through the oil movement hole may be minimized.

In addition, by providing the movement limiting portion on one surface of the rotor core, it is possible to prevent the oil passing through the oil movement hole from moving in the opposite direction to the second oil guiding portion to increase a speed of the oil flowing toward the air gap, thus increasing a cooling rate for the air gap.

In addition, by forming a slot-shaped movement accelerating portion on the outer circumferential surface of the rotor core, when the oil flows into the air gap through the second oil guiding portion and then passes through the air gap, a moving speed of the oil is increased, thereby increasing a cooling rate of the air gap.

In addition, by forming the movement accelerating portion inclined in the axial direction of the rotor core, the moving speed of the oil passing through the air gap may be increased.

In addition, since the end portion of the second oil guiding portion and the rotor core are positioned to be spaced apart from each other, the oil may flow smoothly into the air gap through a separation space between the end portion of the second oil guiding portion and the rotor core.

In addition, since the end portion of the second oil guiding portion and the rotor core are positioned to be spaced apart from each other, the end portion of the second oil guiding portion and the stator core are also spaced apart from each other, so that damage due to frictional contact between the second end ring and the stator core when the rotor core rotates may be prevented.

In addition, since the distance between the end portion of the second oil guiding portion and the rotor core is equal to or less than the width of the air gap, the oil discharged between the second oil guiding portion and the rotor core smoothly flows into the air gap, thus minimizing the amount of oil leakage to the outside of the air gap.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

DETAILED DESCRIPTION OF THE DISCLOSURE

Figure 1:
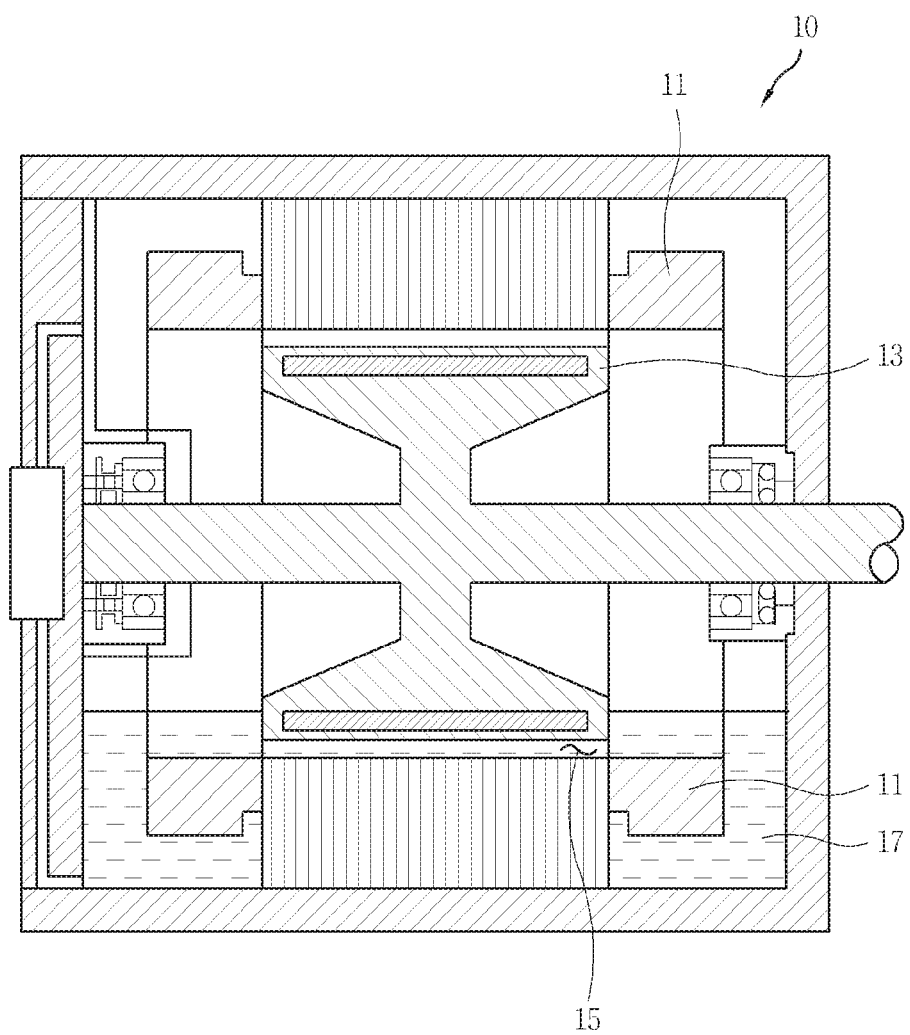
FIG. 1 is a cross-sectional view showing an oil-cooled motor of the related art.

The motor which related to the present disclosure will be described in detail with reference to the accompanying drawings.

Even in different embodiments according to the present disclosure, the same or similar reference numerals are designated to the same or similar configurations, and the description thereof will be substituted by the earlier description.

A singular representation used in the present specification may include a plural representation as far as it represents a definitely different meaning from the context.

Figure 2:
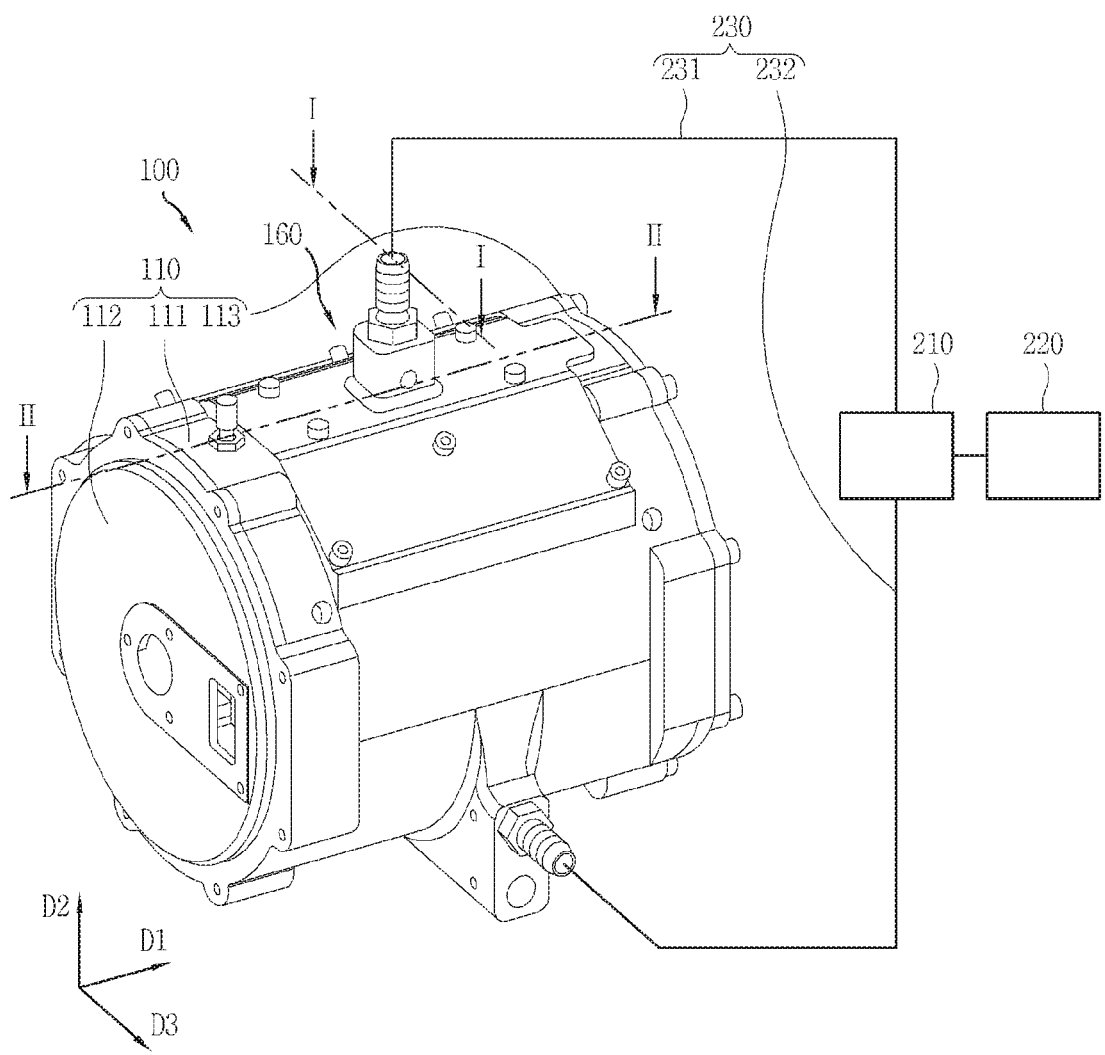
FIG. 2 is a perspective view of a motor according to an embodiment of the present disclosure.
Figure 3:
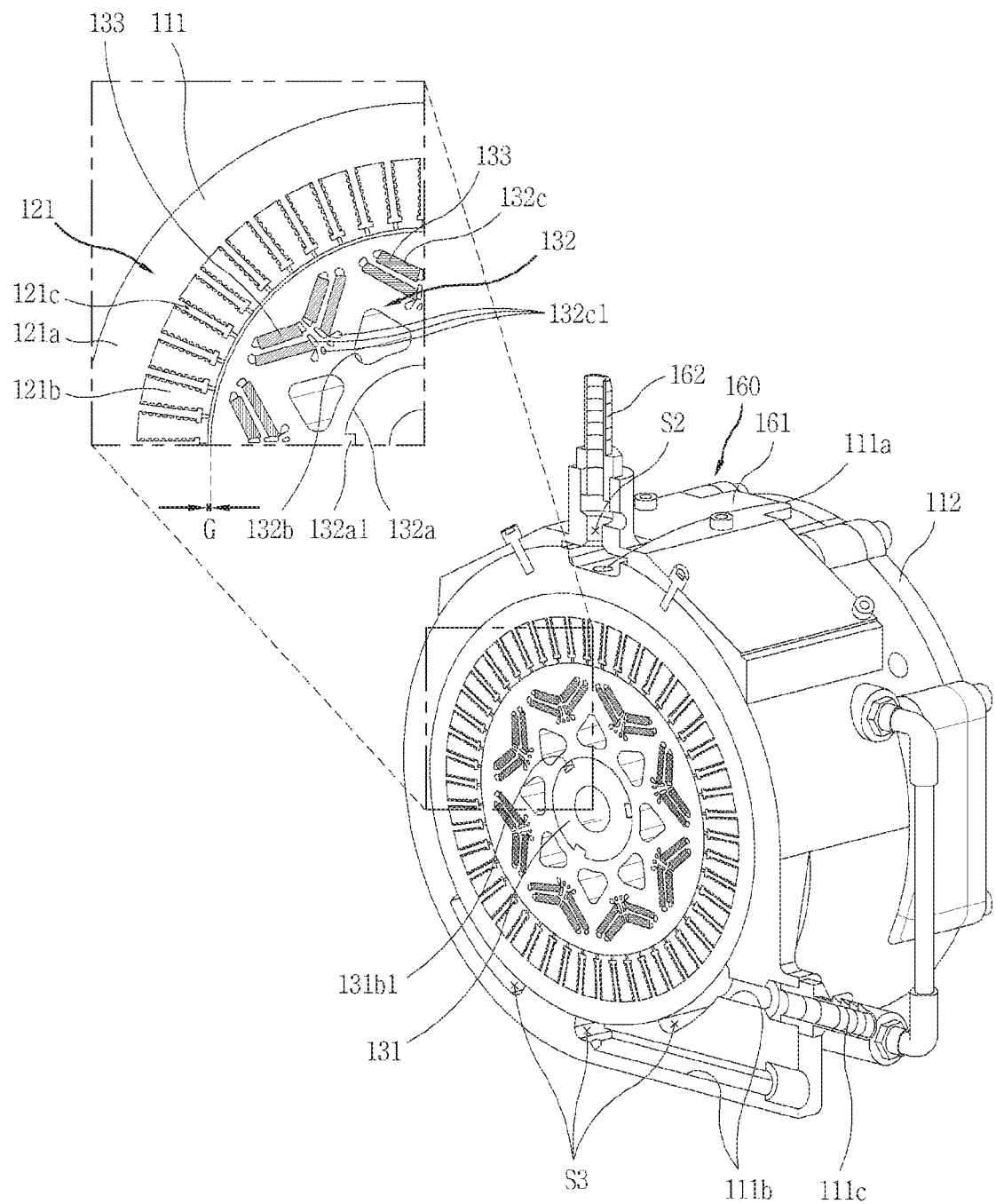
FIG. 3 is a view taken along line I-I in the motor shown in FIG. 2.
Figure 4:
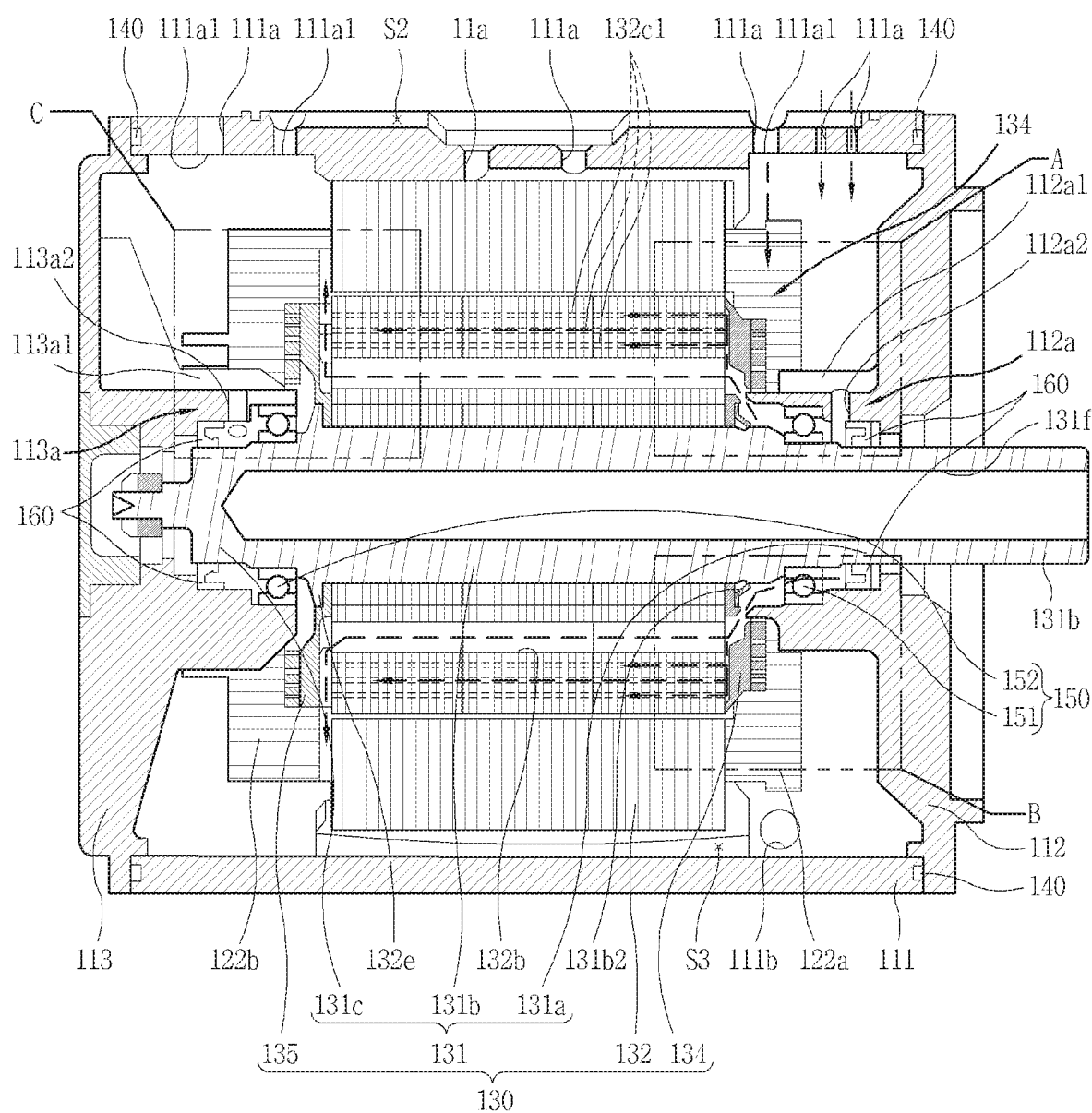
FIG. 4 is a cross-sectional view taken along line II-II of the motor shown in FIG. 2.

FIG. 2 is a perspective view of a motor according to an embodiment of the present disclosure, FIG. 3 is a view taken along line I-I of the motor shown in FIG. 2, and FIG. 4 is a cross-sectional view of the motor illustrated in FIG. 2, taken along line II-II.

The motor 100 according to the present disclosure may include a driving module and a cooling module (not shown). The driving module, including a stator and a rotor assembly, may be configured to convert rotational power using the supplied power. The cooling module may be configured to cool heat generated according to the operation of the driving module. For example, the cooling module may be configured to supply and collect fluid to and from the driving module to cool heat generated according to the driving module, while circulating the fluid.

In addition, the motor 100 may further include an inverter module (not shown) for controlling the driving of the driving module, that is, a rotation speed and a direction of the rotating shaft.

The motor 100 according to the present disclosure may refer to only a driving module or may also have an oil supply module together with a driving module.

The motor 100 according to the present disclosure may correspond to an oil-cooled cooling motor cooled using oil. However, the present disclosure is not limited thereto, and various fluids for cooling as well as oil may be applied.

The motor 100 according to the present disclosure may include a casing 110 and driving units 120 and 130.

The casing 110 may form an appearance of the motor 100 and may form a driving unit accommodating space S1 in which the driving units 120 and 130 are accommodated. The casing 110 may be generally formed in a cylindrical shape. The casing 110 is mounted in a vehicle to provide power for driving of the vehicle, and thus may be disposed in a transverse direction with respect to the ground. That is, a rotating shaft 131 for transmitting rotational power to the outside may extend in parallel with a ground surface.

For convenience of explanation, the left side of FIG. 4 will be referred to as a rear side and the right side will be referred to as a front side. In addition, a direction parallel to the ground will be described as an axial direction D1 of the rotating shaft 131 or a longitudinal direction of a main housing 111.

The casing 110 may include a main housing 111, a first cover 112, and a second cover 113.

The main housing 111 may be formed in a hollow cylindrical shape. The main housing 111 forms a driving unit accommodating space S1 to accommodate the driving units 120 and 130 therein. The driving unit accommodating space S1 may be formed as a substantially cylindrical space. The driving units 120 and 130 may be provided in the driving unit accommodating space S1.

The front and rear of the main housing 111 are formed to be open. A first cover 113 is coupled to a rear opening end of the main housing 111 to cover the rear opening end, and a second cover 113 is coupled to a front opening end to cover the front opening end to define the driving unit accommodating space S1.

However, the structure is not limited thereto, and any one of the first cover 112 and the second cover 113 may be integrally formed with the main housing 111. That is, the main housing 111 is formed such that the front or rear side is blocked, and a cover may be coupled to open end side to cover the same.

The first cover 112 and the second cover 113 may be formed in a shape and size corresponding to a cross-section of the main housing 111 formed in a cylindrical shape. The first cover 113 and the second cover 113 may be coupled to the main housing 111 by using a fastening member such as a bolt.

For example, the main housing 111, the first cover 112, and the second cover 113 may be provided with a fastening protrusion protruding from an outer circumferential surface and overlapping each other in an axial direction D1, and a fastening member may be inserted to be combined thereto.

Alternatively, the fastening member may penetrate through a side wall of the main housing 111, the first cover 112, or the second cover 113 in the axial direction to couple the casing 110. Alternatively, the main housing 111 and the first and second covers 112 and 113 may be coupled by a method such as welding.

Meanwhile, each of the first cover 112 and the second cover 113 may be formed to support the rotating shaft 131 in the radial direction. Details thereof will be described later.

Meanwhile, the motor 100 according to the present disclosure may further include a cooling module. As described above, the motor 100 according to the present disclosure may further include an oil supply module 200 configured to cool heat generated according to driving.

The oil supply module 200 is configured to circulate oil in the casing 110 and cools heat generated according to driving using oil. This will be described in detail below.

The oil supply module 200 may include a pump 210, an oil storage unit 220, and an oil pipe 230.

The pump 210 may be configured to provide a feed force to the oil. The pump 210 may supply the oil stored in the oil storage unit 220 to the inside of the casing 110. In addition, the pump 210 may discharge the oil, whose temperature is increased by cooling the driving units 120 and 130, while circulating the inside of the casing 110, to the outside of the casing 110.

The pump 210 may be configured to be connected to the casing 110 by the oil pipe 230. More specifically, the oil pipe 230 includes an oil supply pipe 231 and an oil discharge pipe 232.

The oil supply pipe 231 connects the oil supply unit 160 of the casing 110 and the pump 210 as described later, and the oil discharge pipe 232 may connect an oil discharge flow path 111b and the pump 210. In addition, the pump 210 may be connected to the oil storage unit 220 in which a predetermined oil is stored.

According to such a structure, the pump 210 may supply the predetermined amount of oil stored in the oil storage unit 220 to the casing 110. In addition, the pump 210 may discharge the oil, whose temperature was increased as the oil cools heat generated according to driving, while circulating the inside of the casing 110, that is, the driving unit accommodating space S1, to the outside of the casing 110.

The oil discharged from the casing 110 may be collected to the oil storage unit 220 again. Although not shown, the oil storage unit 220 may be configured to have a cooling structure such as a heat sink fin to lower the temperature of the oil increased while cooling the driving units 120 and 130.

The oil supply module 200 described above is an example of an oil circulation structure for supplying and discharging oil to and from the casing 110, and is not limited to the above description.

Meanwhile, the oil supplied to the casing 110 by the oil supply module 200 is first provided to the oil supply unit 160. The oil supply unit 160 may be configured to evenly provide oil to the driving unit accommodating space S1.

The oil supply unit 160 may be provided on an outer circumferential surface of the main housing 111. The oil supply unit 160 may be formed to cover a portion of an outer circumferential surface of the main housing 111. According to the present disclosure, the oil may be dropped by gravity and provided to the driving units 120 and 130. Therefore, the oil supply unit 160 may be provided on an upper side with respect to the ground on the outer circumferential surface of the main housing 111. As described above, the main housing 111 is formed in a cylindrical shape and may be disposed in the transverse direction with respect to the ground.

That is, at least a portion of the outer circumferential surface of the main housing 111 is disposed to face the ground surface. If a portion of the outer circumferential surface of the main housing 111 facing the ground surface is called a lower side, an opposite portion may be referred to as an upper side. The oil supply unit 160 may be provided on an upper side of the outer circumferential surface of the main housing 111.

The oil supply unit 160 may include an oil cover 161. The oil cover 161 is formed to cover at least a portion of the outer circumferential surface of the main housing 111. The oil cover 161 may form a predetermined space together with the outer circumferential surface of the main housing 111.

More specifically, the oil cover 161 may be provided to be at least partially spaced apart from the outer circumferential surface of the main housing 111. In addition, a recess may be formed in a portion of the outer circumferential surface of the main housing 111 covered by the oil cover 161.

According to the structure, the oil supply unit 160 may have a predetermined space. The oil supplied by the oil supply module 200 may be accommodated in the predetermined space. The predetermined space is referred to as an oil supply reservoir S2.

The oil contained in the oil supply reservoir S2 moves to the driving unit accommodating space S1 and cools heat of the driving units 120 and 130. To this end, an oil supply flow path 111a is formed at the main housing 111 to connect the oil supply reservoir S2 and the driving unit accommodating space S1. The oil supply flow path 111a is formed to connect the outer circumferential surface and the inner circumferential surface of the main housing 111 through the main housing 111. An oil inlet 111a1 communicating with the oil supply flow path 111a may be formed on an inner circumferential surface of the main housing 111.

As described above, since the oil supply unit 160 is provided above the main housing 111, the oil may be dropped from the upper portion of the driving units 120 and 130 and supplied. Details of the oil movement path will be described later.

Meanwhile, the oil supply flow path 111a may be provided in plural along an extended direction of the main housing 111, that is, along the axial direction D1 of the rotating shaft 131. To this end, the oil supply reservoir S2 may be formed to extend along the axial direction D1. That is, the oil supply reservoir S2 may be formed to extend from one side to which the first cover 112 of the main housing 111 is coupled to the other side to which the second cover 113 is coupled.

Here, an inlet pipe connecting portion 162 into which the oil supplied from the oil supply module 200 flows may be formed at a central portion of the oil supply reservoir S2 in the axial direction D1. The oil supplied from the oil supply module 200 may be evenly distributed along the axial direction D1 of the oil supply reservoir S2. Meanwhile, since an oil inlet 111a1 is formed in plural along the axial direction D1, oil may be evenly supplied from one side to the other side of the driving units 120 and 130.

Hereinafter, the driving unit for generating a rotational force of the motor will be described in detail.

In the casing, that is, in the driving unit accommodating space S1, the driving units 120 and 130 are provided. The driving units 120 and 130 are configured to generate power by using supplied electric energy. More specifically, the driving units 120 and 130 may include a stator 120 and a rotor assembly 130.

The stator 120 and the rotor assembly 130 are in magnetic interaction, and the rotor assembly 130 may be configured to rotate by the magnetic interaction with the stator 120. At least a portion of the rotating shaft 131 of the rotor assembly 130 may be exposed to the outside of the casing 110 to transmit power to the external system.

The stator 120 includes a stator core 121 and a stator coil 122.

The stator core 121 may be formed in a substantially cylindrical shape. The stator core 121 may be formed by stacking a plurality of thin iron plates having an annular shape in the axial direction D1 of the rotating shaft 131.

The stator core 121 may be fixedly coupled to the main housing 111. For example, the outer circumferential surface of the stator core 121 may be fixed to the inner circumferential surface of the main housing 111 by shrinkage fitting (or hot pressing).

According to the present disclosure, a predetermined recess may be formed on the outer circumferential surface of the stator core 121 to protrude from the outer circumferential surface and extend along the axial direction D1 of the rotating shaft 131, and an end surface of the predetermined recess may be in contact with the inner circumferential surface of the main housing 111 and coupled. In this case, the outer circumferential surface of the stator core 121 may have a predetermined interval from the inner circumferential surface of the main housing 111. The predetermined interval may extend along the axial direction D1 and may be a heat sink passage through which heat generated from the stator core 121 is discharged.

The stator core 121 may include a yoke portion 121a and a tooth portion 121b. The yoke portion 121a may be formed in a hollow cylindrical shape as a whole. That is, a predetermined space may be formed. At least a portion of the rotor assembly 130 may be accommodated in the predetermined space.

The outer circumferential surface of the yoke portion 121a may correspond to the outer circumferential surface of the stator core 121. A tooth portion 121b protruding toward the center of the predetermined space in which the rotor assembly 130 is accommodated may be formed on the inner circumferential surface of the yoke portion 121a. The teeth portion 121b may be formed in plurality and may include teeth spaced apart from each other in the circumferential direction.

The teeth portion 121b may be formed to surround at least a portion of the rotor assembly 130. The stator coil 122 may be wound around the teeth portion 121b. The stator coil 122 are wound around a plurality of teeth. According to the present disclosure, the stator coil 122 may be wound in a concentrated winding method in which the stator coil 122 is wound around one tooth concentratedly but is not limited thereto. The stator coil 122 may also be wound in a distribution winding method in which the stator coil 122 is wound around a plurality of teeth at the same time.

The stator coil 122 generates lines of magnetic force by supplied electric energy and interlinked with a magnetic field of the rotor assembly 130 to rotate the rotor assembly 130.

The rotor assembly 130 may be at least partially accommodated in the stator 120. The rotor assembly 130 may be coupled to the stator 120 with a predetermined gap G therebetween in a state of being accommodated in the stator 120. More specifically, the rotor assembly 130 may be provided to face the inner circumferential surface of the stator 120, that is, the teeth portion 121b.

The rotor assembly 130 may include a rotating shaft 131, a rotor core 132, and a magnetic member 133. The magnetic member 133 may be implemented by a plurality of permanent magnets. In addition, according to the present disclosure, the rotor assembly 130 may include a first end ring 134 and a second end ring 135 coupled to one side and the other side of the rotor core 132.

The rotating shaft 131 may extend in one direction. As described above, the motor according to the present disclosure may be provided in a state of lying down in the transverse direction due to the characteristics of the motor used as a driving source of a vehicle. Accordingly, one direction in which the rotating shaft 131 extends may be parallel to the ground surface. In other words, it may correspond to a longitudinal direction in which the casing 110 formed in a cylindrical shape extends.

The rotor core 132, the first end ring 134, and the second end ring 135 may be coupled to the rotating shaft 131. To this end, a first support portion 131a, a rotor coupling portion 131b, and a second support portion 131b may be sequentially formed from the front to the rear of the rotating shaft 131.

In addition, the rotating shaft 131 may further include an extending portion 131d extending from the end of the first support portion 131a to the outside of the casing 110 to transmit power of the driving units 120 and 130 to an external system.

The rotating shaft 131 may be formed to have a different diameter depending on a position where the first support portion 131a, the rotor coupling portion 131b, and the second support portion 131b are formed. That is, the outer circumferential surface of the rotating shaft 131 may be formed to be stepped at least one or more times. For example, the first support portion 131a and the second support portion 131b may be formed to have substantially the same diameter, and the rotor coupling portion 131b may be formed to have a diameter larger than that of the first support portion 131a and the second support portion 131b.

The first support portion 131a may be accommodated in the first shaft receiving portion 112a of the first cover 112 and supported in the radial direction, and the second support portion 131b may be accommodated in the second shaft receiving portion 113a of the second cover 113 and supported in the radial direction. That is, the rotating shaft 131 may be supported on both sides of the first cover 112 and the second cover 113.

Meanwhile, the rotor coupling portion 131b is formed between the first support portion 131a and the second support portion 131b. The rotor coupling portion 131b is coupled to the rotor core 132. The rotor core 132 is generally formed in a cylindrical shape and has a rotating shaft coupling hole 132a formed at the center thereof in the axial direction D1.

The rotating shaft coupling hole 132a includes a rotating shaft coupling protrusion 132a1 protruding toward the center thereof. The rotating shaft coupling protrusion 132a1 is formed to protrude toward the center from the inner circumferential surface of the rotating shaft coupling hole 132a and is provided in plurality and spaced apart from each other along the inner circumferential direction. The rotating shaft coupling protrusion 132a1 is fitted into the coupling recess 131b1 formed at the rotor coupling portion 131b of the rotating shaft 131.

The coupling recess 131b1 may be recessed to correspond to the shape of the rotating shaft coupling protrusion 132a1 on the outer circumferential surface of the rotor core 132. In addition, as the rotating shaft coupling protrusion 132a1 extends in the axial direction D1, the coupling recess 131b1 may also extend in the axial direction D1 as much. By such a structure, the rotor core 132 may be prevented from rotating about the rotating shaft 131. That is, the rotor core 132 and the rotating shaft 131 may rotate together.

Meanwhile, the second end ring 135, the rotor core 132, and the first end ring 134 are sequentially coupled to the rotating shaft 131 in a direction from the rear side to the front side. In this case, in order to prevent the components coupled to the rotating shaft 131 from moving in the axial direction D1, the rotating shaft 131 includes an axial support protrusion 131e for supporting the components in the axial direction D1.

The axial support protrusion 131e is formed between the second support portion 131c and the rotor coupling portion 131b and supports the second end ring 135 facing the second cover 133 in the axial direction D1. Accordingly, movement of the second end ring 135, the rotor core 132, and the first end ring 134 toward the rear side may be limited.

Meanwhile, the first end ring 134 may include a rotating shaft engaging portion 134e to restrict the components coupled to the rotating shaft 131 from moving forward along the axial direction D1. The rotating shaft engaging portion 134e may be formed of a material having a predetermined elasticity and may be inserted into and coupled to the first end ring engaging recess 131b2 protruding toward the rotating shaft and formed at the rotating shaft 131.

The first end ring 134, the rotor core 132, and the second end ring 135 may be fixed and coupled with respect to the rotating shaft 131 by the axial support protrusion 131e and the first end ring engaging recess 131b2, without moving in the axial direction D1.

Meanwhile, the rotating shaft 131 may further include a hollow hole 131f formed to penetrate through the center. The motor 100 according to the present disclosure should output a high torque due to the characteristics used as a driving source of a vehicle. In this case, if the diameter of the rotating shaft 131 is relatively small, the rotating shaft 131 may be broken without enduring a rotational stress.

Accordingly, a diameter of the rotating shaft 131 of the motor 100 according to the present disclosure must be equal to or larger than a predetermined size. In this case, since the weight of the rotating shaft 131 is increased, efficiency of the motor 100 may be reduced. As a result, a hollow hole 131f penetrated in the axial direction D1 may be formed at the central portion of the rotating shaft 131 to reduce the weight.

The hollow hole 131f may extend from the extending portion 131d to the second support part 131c. Meanwhile, a diameter of the hollow hole 131f may be designed in consideration of the reduced weight of the rotating shaft 131 and an allowable stress generated when transmitting power to an external system.

In addition, a sealing member 140 may be provided at one end and the other end of the rotating shaft 131. The sealing member 140 is formed to surround the rotating shaft 131 and is provided at each of the first and second shaft receiving portions 112a and 113a. It is possible to prevent dust, moisture, and the like from flowing into the motor 100 by the sealing member 140.

The rotor core 132 will be described below.

As described above, the rotor core 132 is coupled to the rotating shaft coupling portion 131b of the rotating shaft 131. The rotor core 132 may be provided to be accommodated in the stator 120. Like the stator core 121, the rotor core 132 may be formed by stacking a plurality of thin iron plates in the axial direction D1 of the rotating shaft 131. In this case, the length of the rotor core 132 in the axial direction D1 may be substantially equal to the length of the stator core 121 in the axial direction.

As described above, the rotating shaft coupling hole 132a and the rotating shaft coupling protrusion 132a1 may be formed at the central portion of the rotor core 132 in the axial direction D1 and coupled to the rotating shaft 131.

In addition, the rotor core 132 may further include a plurality of holes 132b and 132c except for the rotating shaft coupling hole 132a. The plurality of holes 132b and 132c may correspond to a weight reduction hole 132b (hereinafter, first hole) and a magnetic member accommodating hole 132c (hereinafter, second hole).

The first hole 132b and the second hole 132c may be formed to penetrate the rotor core 132 in the axial direction D1 to form a predetermined space.

The first hole 132b may be formed to form a cross-section of various shapes including a quadrangle, a triangle, a circle, and a combination thereof. The first hole 132b may be provided in plurality in the circumferential direction to reduce the weight of the rotor core 132. As the weight of the rotor core 132 is reduced, unnecessary output of the driving units 120 and 130 may be reduced, so that efficiency of the motor 100 may be increased.

The second hole 132c may accommodate the magnetic member 133 formed of a permanent magnet. The second hole 132c may be formed in a generally rectangular shape to correspond to the magnetic member 133 having a rectangular cross-section. Here, the second hole 132c may have a rectangular shape having a long side that is formed relatively long and a short side that is formed relatively short. The second hole 132c may be described as extending in a direction in which the long side extends. In this case, the second hole 132c may be formed to extend in a direction perpendicular to the radial direction of the rotor core 132.

Meanwhile, flux barriers 132c1 facing the side surfaces of the magnetic member 133 may be formed on both sides of the second hole 132c. The flux barrier 132c1 may be formed adjacent to the magnetic member 133 to reduce a torque ripple phenomenon. Detailed description thereof will be omitted because it is apparent to those skilled in the art.

The flux barrier 132c1 may be formed in various shapes according to the design of the rotor core 132 considering the magnetic flux. The flux barrier 132c1 may be integrally formed with the magnetic member accommodating space of the second hole 132c. However, the present disclosure is not limited thereto and the flux barrier 132c1 may be formed to be spaced apart from the magnetic member accommodating space of the second hole 132c.

Here, the second hole 132c may have a concept including both the space in which the magnetic member 133 is accommodated and the flux barrier 132c1.

Meanwhile, since the second hole 132c accommodates the magnetic member 133, the second hole 132c is formed adjacent to the outer circumferential surface of the rotor core 132. In this case, the first hole 132b may be formed between the rotating shaft coupling hole 132a and the second hole 132c. In other words, the first hole 132b may be formed to be adjacent to the rotating shaft 131, and the second hole 132c may be formed to be adjacent to the outer circumferential surface of the rotor core 132.

Meanwhile, the magnetic member 133 inserted into the second hole 132c may be formed of a neodymium magnet. However, the present disclosure is not limited thereto, and the magnetic member 133 may be formed of a samarium cobalt (SmCo) magnet or the like.

Meanwhile, as described above, the magnetic member 133 may be formed to have a rectangular cross-section. In addition, since the magnetic member 133 is formed to extend in the axial direction D1, the magnetic member 133 may be formed to have an overall hexahedral shape. The magnetic member 133 may have one member extending to correspond to the length of the rotor core 132 in the axial direction D1. On the contrary, the magnetic member 133 may have a predetermined length and may be formed by stacking a plurality of the magnetic members 133 in the axial direction D1.

Meanwhile, according to the present disclosure, the magnetic member 133 having the rectangular shape may supply oil supplied by the oil supply module 200 into the rotor assembly 130, more specifically, the rotor core 132.

The first end ring 134 is coupled to one side of the rotor core 132 to guide the oil flowing into the driving unit accommodating space S1 into the rotor core 132, and the second end ring 135 may be coupled to the other side of the rotor core 132 to guide the oil flowing in the rotor core 132 so as to be discharged.

Hereinafter, a flow path of oil will be described in detail.

As described above, the oil accommodated in the oil supply reservoir S2 flows into the driving unit accommodating space S1 through the oil inlet 111a1. In this case, since the oil supply unit 160 is provided above the driving units 120 and 130, the oil inlet 111a1 is positioned above the driving units 120 and 130. In this case, the oil flowing into the driving unit accommodating space S1 through the oil inlet 111a1 may be dropped and supplied to the driving units 120 and 130.

More specifically, the oil supply flow path 111a is provided in plural along the axial direction D1. Therefore, the plurality of oil inlets 111a1 may be provided on an upper inner circumferential surface of the main housing 111 along the axial direction D1. In addition, since the cross-section of the main housing 111 is generally circular, when the oil supply unit 160 is formed on the upper side of the main housing 111, the oil inlet 111a1 may be formed at the center of the main housing in the width direction D3. Accordingly, the oil inlets 111a1 are provided to overlap the driving units 120 and 130 in the gravity direction, that is, the height direction D2.

Meanwhile, at least part of the oil inlet 111a1 may face the outer circumferential surface of the stator 120. At least part of the oil flowing through the oil inlet 111a1 facing the outer circumferential surface of the stator 120 may be supplied to the stator through a gap between the stator cores formed of a plurality of iron plates. In addition, the other part of the oil may be guided toward one side of the rotor assembly 130 through a flow path formed to extend along the axial direction.

Meanwhile, the other part of the oil flowing through the inlet 111a1 may be supplied to be dropped from the driving unit accommodating space S1. As described above, since the oil inlet 111a1 is formed to overlap the driving units 120 and 130 in the gravity direction or the height direction D2, the dropped oil may be supplied into the driving units 120 and 130, more specifically, the rotor assembly 130.

Here, the oil supplied to one side of the rotor assembly 130 may be guided into the rotor core 132 by the first end ring 134.

Hereinafter, the structure of the first end ring 134 will be described in detail.

Figure 5:
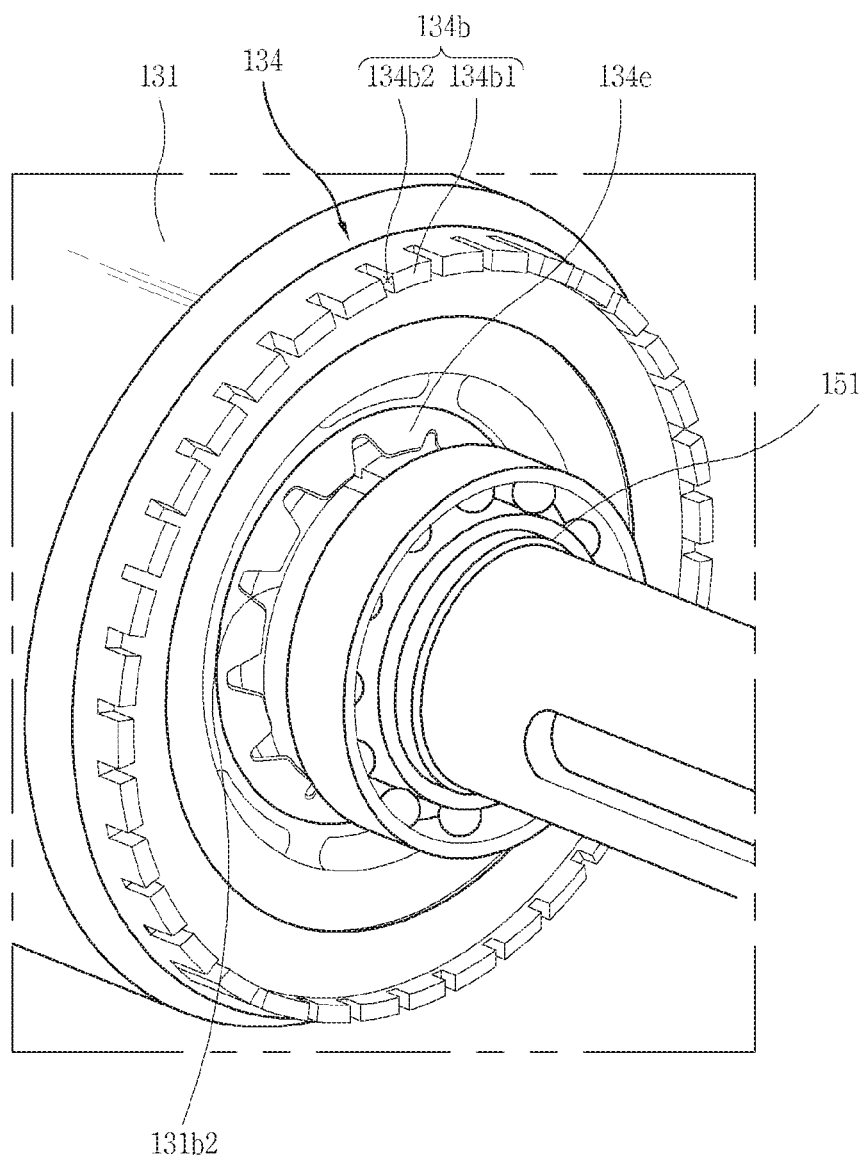
FIG. 5 is a perspective view showing a portion of a front side of a rotor assembly.
Figure 6:
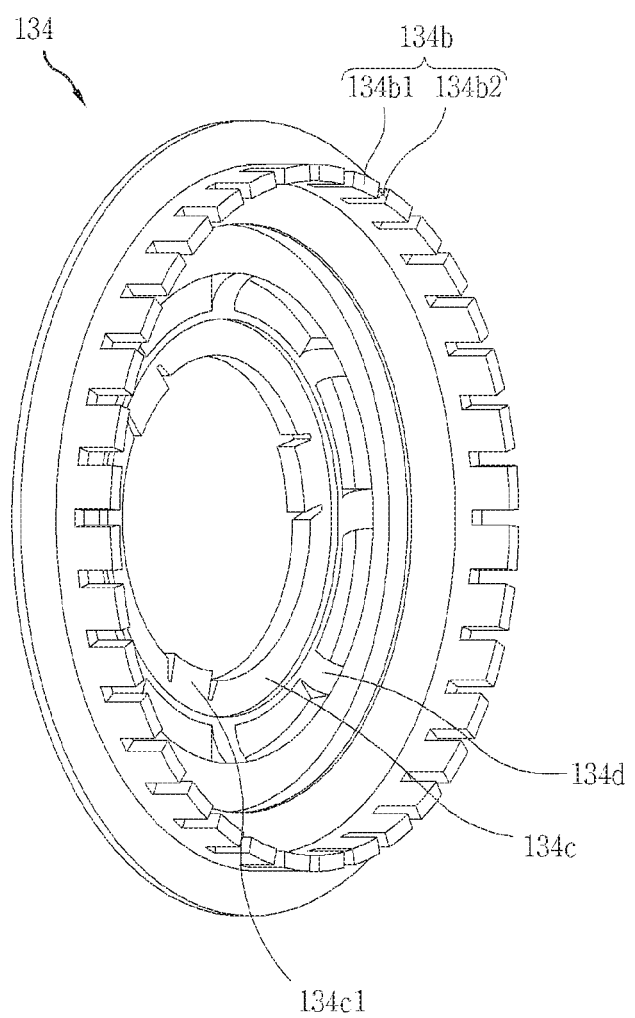
FIG. 6 is a perspective view illustrating a front surface of a first end ring illustrated in FIG. 5.
Figure 7:
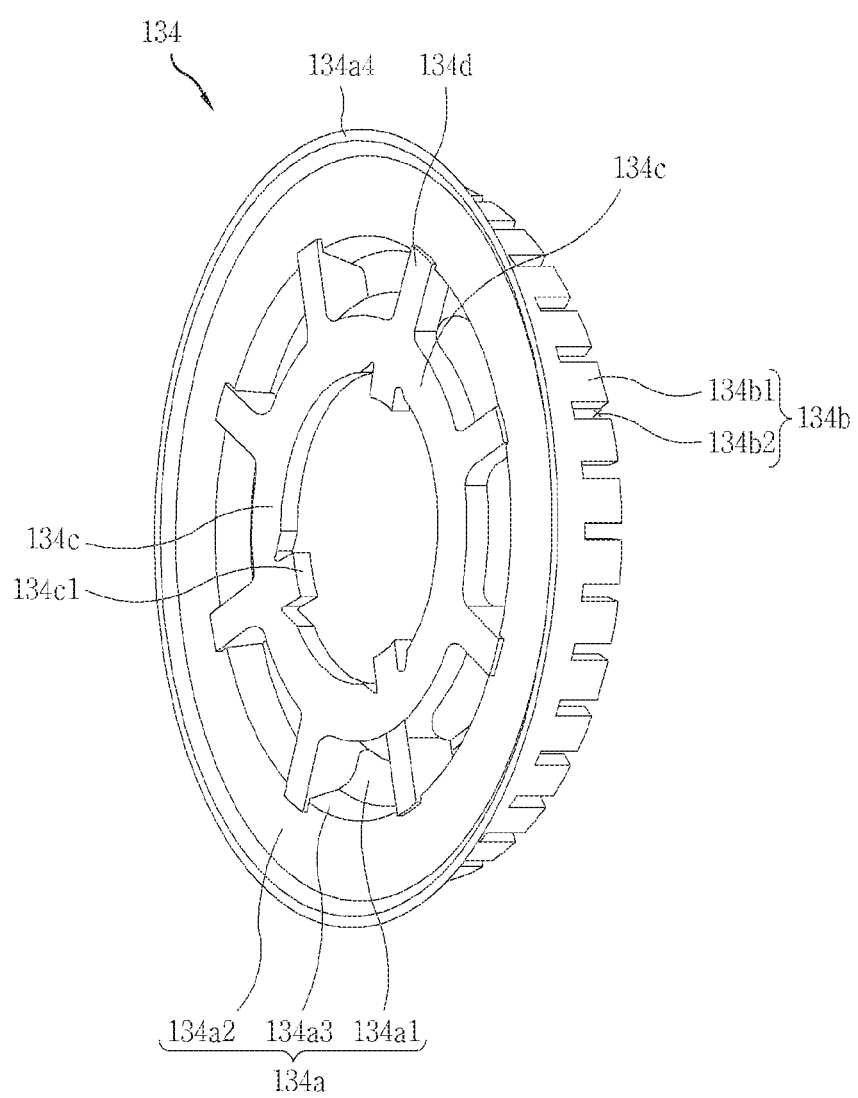
FIG. 7 is a perspective view illustrating a rear surface of the first end ring of FIG. 6.
Figure 8:
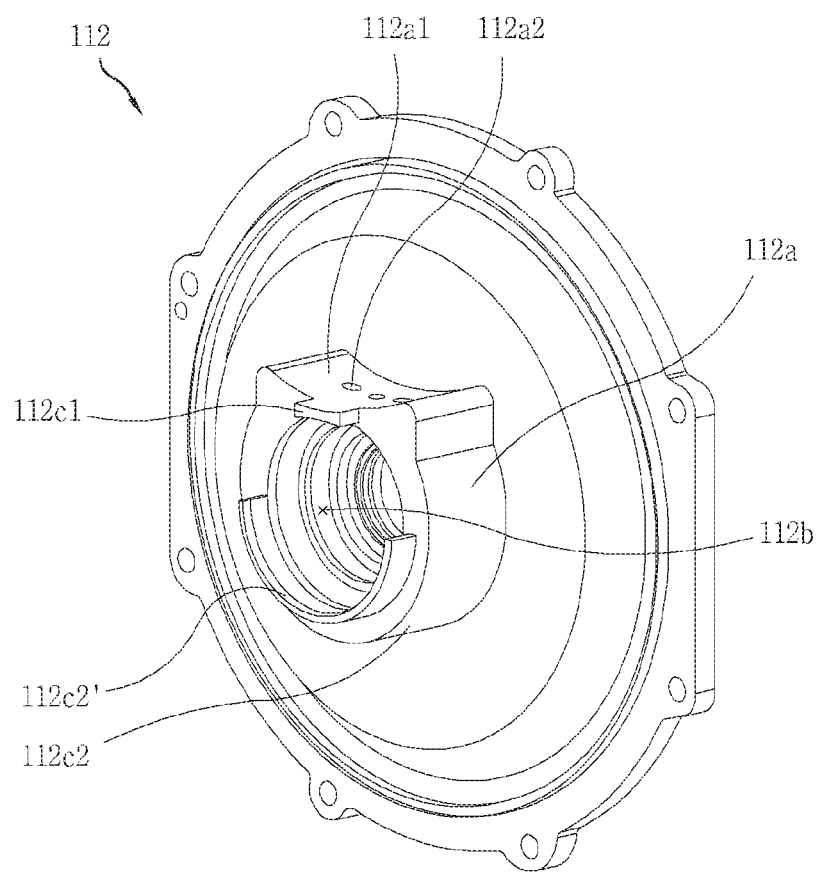
FIG. 8 is a perspective view illustrating a rear surface of a first cover of the motor shown in FIG. 3.

FIG. 5 is a perspective view showing a portion of a front side of a rotor assembly, FIG. 6 is a perspective view illustrating a front surface of a first end ring illustrated in FIG. 5, FIG. 7 is a perspective view illustrating a rear surface of the first end ring of FIG. 6, and FIG. 8 is a perspective view illustrating a rear surface of a first cover of the motor shown in FIG. 3.

The first end ring 134 may be formed to guide oil supplied to the rotor assembly 130 by falling into the rotor core 132. This will be described in detail below.

Referring to the drawings, the first end ring 134 is coupled to the front side of the rotor core 132. More specifically, the first end ring 134 is formed to cover one surface of the front side of the rotor core 132. That is, the first end ring 134 may be formed to have a generally circular cross-section to correspond to the cross-section of the rotor core 132 formed in a circular shape.

The first end ring 134 may be formed such that a diameter thereof corresponds to the diameter of the rotor core 132. The first end ring 134 may be formed to surround the body portion formed in an annular shape and the rotating shaft 131 and include a rotating shaft coupling portion 134c fastened to the rotating shaft 131 and a connecting portion 134e connecting the body portion and the rotating shaft coupling portion 134c.

The body portion may include a front surface and a rear surface facing one surface of the rotor core 132. The rear surface of the body portion may be formed to be stepped at least one or more times. A first guiding surface 134a for guiding oil to the inside of the rotor core 132, that is, the plurality of holes 132b and 132c may be formed on the rear surface of the body portion. The front surface of the body portion may be formed with a first scattering portion 134b for scattering oil in the radial direction. Details will be described later.

The first end ring 134 may be coupled to the rotating shaft 131 by the rotating shaft fastening portion 134c. The rotating shaft fastening portion 134c may be formed to surround the outer circumferential surface of the rotating shaft 131. The rotating shaft fastening portion 134c may have a first rotating shaft fastening protrusion 134c1 inserted into and coupled to the first end ring engaging recess 131b2 of the rotating shaft 131.

The first end ring engaging recess 131b2 may be formed to be recessed on the outer circumferential surface of the rotating shaft 131. The first rotating shaft fastening protrusion 134c1 may be formed to protrude from the rotating shaft fastening portion 134c facing the outer circumferential surface of the rotating shaft 131, and at least a portion of the first rotating shaft fastening protrusion 134c1 may be inserted into the first end ring engaging recess 131b2 and supported in the axial direction. At this time, the rotating shaft fastening portion 134c may be inserted into the first end ring engaging recess 131b2 in an elastically deformed state.

Accordingly, the second end ring 135, the rotor core 132, and the first end ring 134 sequentially coupled to the rotating shaft 131 may be supported in the axial direction.

Meanwhile, the body portion and the rotating shaft fastening portion 134c may be connected by the connecting portion 134d. The connecting portion 134d may be formed to extend in the radial direction and may be formed of a plurality of members spaced apart from each other in the circumferential direction. The space between the connecting portions 134d may be used as a passage for supplying the oil to the rotor core 132.

Meanwhile, according to the present disclosure, the first end ring 134 may include the first oil guiding surface 134a for supplying oil dropped and supplied to the rotor assembly 130, to the plurality of holes 132b and 132c of the rotor core 132.

The first oil guiding surface 134a may be formed at the body portion. The first oil guiding surface 134a may be formed on a rear surface of the body portion facing one surface of the rotor core 132. The first oil guiding surface 134a may face one surface of the rotor core 132. More specifically, the first oil guiding surface 134a may face the plurality of holes 132b and 132c. In addition, the first oil guiding surface 134a may be formed to extend in a direction perpendicular to the axial direction of the rotating shaft 131.

In other words, the first oil guiding surface 134a may be formed to extend in the radial direction and may be spaced apart from one surface of the rotor core 132 at a predetermined interval. Therefore, as will be described later, the oil may be transferred in the radial direction through the predetermined interval.

Meanwhile, the first oil guiding surface 134a may be formed to be stepped at least one or more times. More specifically, the first oil guiding surface 134a may include a first guiding surface 134a1, a second guiding surface 134a2, and a third guiding surface 134a3.

The first guiding surface 134a1 and the second guiding surface 134a2 may be sequentially formed at the center of the rotating shaft 131 in the radial direction, and the third guiding surface 134a3 may be formed to connect the first guiding surface 134a1 and the second guiding surface 134a2.

The first guiding surface 134a1 may be formed to face the first hole 132b. The second guiding surface 134a2 may be formed to extend in the radial direction from the first guiding surface 134a1. The first guiding surface 134a1 and the second guiding surface 134a2 may extend parallel to one surface of the rotor core 132. However, the present disclosure is not limited thereto and the first guiding surface 134a1 and the second guiding surface 134a2 may be inclined with respect to the axial direction.

As described above, the first oil guiding surface 134a is formed to be stepped at least once. In addition, the first guiding surface 134a1 and the second guiding surface 134a2 may be formed to be spaced apart from each other in the axial direction. In this case, the first guiding surface 134a1 and the second guiding surface 134a2 may be connected by the third guiding surface 134a3.

More specifically, the first guiding surface 134a1 may be further spaced apart from one surface of the rotor core 132 in the axial direction than the second guiding surface 134a2. The first guiding surface 134a1 and the second guiding surface 134a2 may be connected by the third guiding surface 134a3 extending in the axial direction. Here, the third guiding surface 134a3 may extend to be inclined with respect to the axial direction. The third guiding surface 134a3 may be inclined in a direction to face each of one surface of the rotor core 132 and the outer circumferential surface of the rotating shaft 131. The oil supplied to the first OIL guiding surface 134a may be properly distributed to the first hole 132b and the second hole 132c by the third guiding surface 134a1 formed to be inclined.

Meanwhile, the second guiding surface 134a2 is spaced apart from one surface of the rotor core 132 to form a gap through which oil may flow. To this end, a spacing protrusion 134a4 may be formed to protrude toward the rear side from the second guiding surface 134a2. The spacing protrusion 134a4 is formed to protrude from the second guiding surface 134a2 and may be provided to be in contact with one surface of the rotor core 132. Accordingly, a predetermined gap is formed between the second guiding surface 134a2 and one surface of the rotor core 132 and the oil supplied to the second guiding surface 134a2 may flow in the radial direction according to rotation of the rotor assembly 130.

Meanwhile, the spacing protrusion 134a4 may be formed to extend in the circumferential direction along the edge of the first end ring 134. Accordingly, the oil flowing in the radial direction may be supplied to the plurality of holes 132b and 132c without being released to the outside of the rotor assembly 130.

Meanwhile, the first end ring 134 may include a first scattering portion 134b formed on the other surface of the first end ring 134 opposite to one surface facing the rotor core 132. The first scattering portion 134b may be formed on the front surface of the first end ring 134, more specifically, on the front surface of the body portion. The first scattering portion 134b may be formed to radially scatter the oil supplied to the front surface of the first end ring 134.

The first scattering portion 134b may include a first edge portion 134b1 and a first slit portion 134b2. The first edge portion 134b1 may protrude from the front surface of the body portion and may extend in the circumferential direction from the edge of the first end ring 134. In addition, the first slit portion 134b2 may be recessed in the axial direction from the first edge portion 134b1 may be formed in plurality along the circumferential direction. The oil may be evenly scattered in the circumferential direction by the first scattering portion 134b having such a structure.

Meanwhile, the first scattering portion 134b may overlap the first end turn 122a in the radial direction of the rotating shaft 131. In this case, the oil scattered in the radial direction by the first scattering portion 134b may be supplied to the first end turn 122a. Thus, heat of the first end turn 122a may be cooled. In addition, scattered particles of the oil may be atomized to collide with the first end turn 122a. As a result, at least part of the oil may temporarily absorb heat, while floating in the inner space of the casing. Accordingly, overall cooling performance of the motor may be improved.

Figure 9:
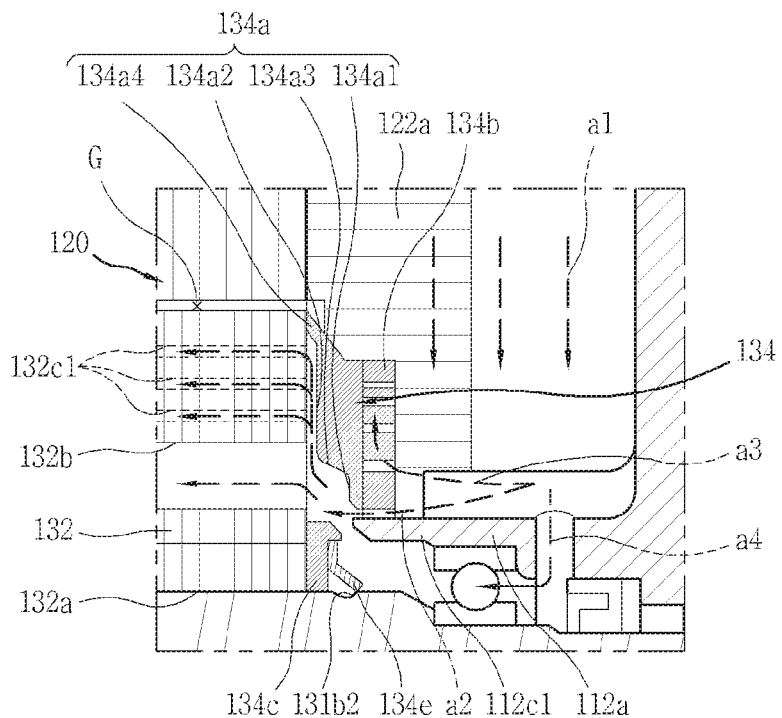
FIG. 9 is an enlarged view of A of FIG. 4.
Figure 10:
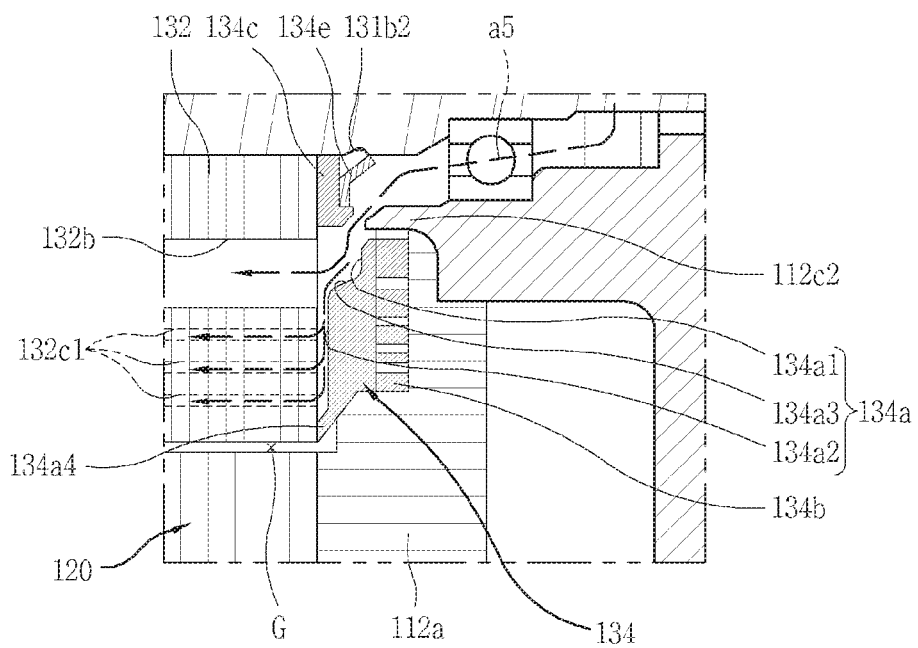
FIG. 10 is an enlarged view of B in FIG. 4.

FIG. 9 is an enlarged view of A of FIG. 4, and FIG. 10 is an enlarged view of B in FIG. 4.

Referring to FIG. 9 together with FIGS. 3 and 8, the first cover 112 may be formed to supply oil flowing in through the oil inlet 111a1 and dropped, to the rotor assembly 130. This will be described in detail below.

The first cover 112 includes a first shaft receiving portion 112a formed to support one side of the rotating shaft 131. The first shaft receiving portion 112a may protrude from the rear surface of the first cover 112 toward the rotor assembly 130. In other words, the first shaft receiving portion 112a may protrude from the rear surface of the first cover 112 toward the rear side.

The first shaft receiving portion 112a forms a rotating shaft accommodating space 112b that accommodates at least a portion of the rotating shaft 131. At least a portion of the rotating shaft 131 may be accommodated in the rotating shaft accommodating space 112b. At least a portion of the rotating shaft 131 accommodated in the first rotating shaft accommodating space 112b may be radially supported by the first bearing 151 provided in the rotating shaft accommodating space 112b.

Meanwhile, the oil inlet 111a1 may be formed to overlap the rotor assembly 130 in the gravity direction, that is, in the height direction D2 of the motor 100 so that the oil is dropped and supplied to the rotor assembly 130. In other words, the oil inlet 111a1 is located above the rotor assembly 130.

However, the rotor core 132 of the rotor assembly 130 and the first and second end rings 134 and 135 are covered by the stator 120, so that the dropped oil is not immediately supplied. Accordingly, the oil may be dropped outside the region where the stator 120 is located, and supplied to the rotor assembly 130. Therefore, in order for the oil to be supplied to the rotor core 132 and the first and second end rings 134 and 135, at least the dropped oil must be guided in the axial direction.

According to the present disclosure, the first shaft receiving portion 112a may be formed to supply oil dropped from the oil inlet 111a1 to the rotor assembly 130. This will be described in detail below.

One surface of the first shaft receiving portion 112a facing the oil inlet 111a1 may be concave. In other words, the first shaft receiving portion 112a may include a first oil reservoir surface 112a1 formed concave on one surface of the first shaft receiving portion 112a facing the oil inlet.

The first oil reservoir surface 112a1 does not allow the oil dropped from the oil inlet 111a1 to flow immediately to the lower side of the driving unit accommodating space S1. That is, the oil dropped from the oil inlet 111a1 may temporarily stay on the first oil reservoir surface 112a1.

The oil staying on the first oil reservoir surface 112a may be supplied to the first end ring 134. To this end, the first shaft receiving portion 112a may include an oil guide protrusion 112c. The oil guide protrusion 112c may be formed to protrude from an end surface of the first shaft receiving portion 112a. More specifically, the oil guide protrusion 112c may be formed to protrude toward the first end ring 134 from one surface of the first shaft receiving portion 112a facing the rotor core 132.

The oil guide protrusion 112c may overlap the first end ring 134 in the radial direction of and the rotating shaft 131 so that oil may be easily guided to the first oil guiding surface 134a. That is, the first oil guiding surface 134a may be located at the radially outer side of the oil guide protrusion 112c.

The oil guide protrusion 112c may include a first oil guide protrusion 112c1 and a second oil guide protrusion 112c2. The first oil guide protrusion 112c1 may be formed to be inclined upward based on the rotating shaft 131 and may be connected to the first oil reservoir surface 112a1.

In addition, one surface facing toward the upper side of the first oil guide protrusion 112c1 may be formed concave like the first oil reservoir surface 112a1. Accordingly, the first oil guide protrusion 112c1 may form a flow path extending in the axial direction from the first oil reservoir surface 112a1.

Meanwhile, the first oil guide protrusion 112c1 may be provided to overlap the oil inlet 111a1 in the gravity direction (or height direction D2). That is, the oil introduced by the oil inlet 111a1 may be dropped toward the first oil guide protrusion 112c1.

The second oil guide protrusion 112c2 may be formed to be inclined downward based on the rotating shaft 131. The second oil guide protrusion 112c2 may extend along the circumferential direction of the rotating shaft 131 to surround at least a portion of the rotating shaft 131 at the lower portion of the rotating shaft 131.

Meanwhile, the first shaft receiving portion 112a may include a first oil inlet hole 112a2 formed to allow the first oil reservoir surface 112a1 and the first rotating shaft accommodating space 112b to communicate with each other. The first oil inlet hole 112a2 may be formed to penetrate through the first shaft receiving portion 112a in the height direction D2 of the motor at the upper side with respect to the rotating shaft 131.

A portion of the oil remaining on the first oil reservoir surface 112a1 may flow into the first rotating shaft accommodating space 112b by the first oil inlet hole 112a2. Accordingly, the first bearing 151 may not only maintain lubricity by oil but also cool heat generated in the first bearing 151 according to driving.

Meanwhile, the oil remaining on the first oil reservoir surface 112a1 may be guided to the first end ring 134 through a plurality of paths.

Referring to FIGS. 9 and 10 again, the oil supplied to the first oil reservoir surface 112a through a first path a1 dropped from the oil inlet 111a1 temporarily stays on the first oil reservoir surface 112a1 and may be transferred to the first end ring 134 via second to fifth paths.

A second path a2 is a path for moving the first oil guide protrusion 112c1 in the axial direction. More specifically, at least part of the oil staying on the first oil reservoir surface 112a1 moves in the axial direction through a flow path formed on the upper surface of the first oil guide protrusion 112c1.

In this case, the oil moved through the first oil guide protrusion 112c1 generates radial and axial flow forces in accordance with the rotation of the rotor assembly 130. Accordingly, the oil is guided to the first oil guiding surface 134a and flows radially along the first oil guiding surface 134a.

Thereafter, the oil is continuously pushed by the oil continuously supplied from the first oil reservoir surface 112a1 and flows into the plurality of holes 132b and 132c. As described later, the oil flowing into the plurality of holes 132b and 132c may be more accelerated in the axial flow by a suction force by the second end ring 135.

Meanwhile, a third path a3 is a path in which oil is supplied from the first oil reservoir surface 112a1 to the front surface of the first end ring 134. At least part of the oil staying on the first oil reservoir surface 112a1 may be transferred to the first scattering portion 134b of the first end ring 134.

The oil transferred to the first scattering portion 134b is scattered in the radial direction, thereby cooling the first end turn 122a. In addition, at least part of the oil collided with the first end turn 122a may cool the inside of the motor 100, while floating in the driving unit accommodating space S1.

Meanwhile, a fourth path a4 and a fifth path a5 are path through which the oil staying on the first oil reservoir surface 112a1 flows into the first rotating shaft accommodating space 112b through the first oil inlet hole 112a2.

In the fourth path a4, at least part of the oil flowing into the first rotating shaft accommodating space 112b through the first oil inlet hole 112a2 may move in the axial direction on the upper side of the rotating shaft 131. In this case, at least part of the oil moving in the axial direction on the upper side of the rotating shaft 131 comes into contact with the first bearing 151 and the other part thereof moves in the axial direction between the rotating shaft 131 and the first oil guide protrusion 112c1.

In the fifth path a5, another part of the oil flowing into the first rotating shaft accommodating space 112b through the first oil inlet hole 112a2 may be axially moved on the lower side of the rotating shaft 131. Like the fourth path a4, at least part of the oil moving in the axial direction on the lower side of the rotating shaft 131 comes into contact with the first bearing 151 and the other part thereof may be moved in the axial direction and supplied to the end ring 134.

More specifically, the fifth path a5 moves in the axial direction on the lower side of the rotating shaft 131 and may be supplied to the first end ring 134 through the second oil guide protrusion 112c2.

As such, the oil dropped to the first shaft receiving portion 112a does not flow directly to the lower side of the rotor assembly 130 (or to the lower side of the driving unit accommodating space) and remains on the first oil reservoir surface 112a1 and is supplied to the first end ring 134. Accordingly, the utility of the oil circulated in the casing 110 may be increased.

By the oil flowing into the first hole 132b and the second hole 132c, heat generated by the magnetic member 133 may be quickly cooled. As a result, a phenomenon of magnet demagnetization of the magnetic member 133 may be reduced, so that performance of the motor may be maintained for a long time and durability and life of the motor may be increased by preventing overheating of the motor.

Meanwhile, the oil guided into the rotor core 132 from one side of the rotor core 132 passes through the plurality of holes 132b and 132c and is then discharged from the other side of the rotor core 132. The oil discharged from the rotor core 132 may be scattered in the radial direction through the second end ring.

Hereinafter, the structure of the second end ring 135 will be described in detail.

Figure 11:
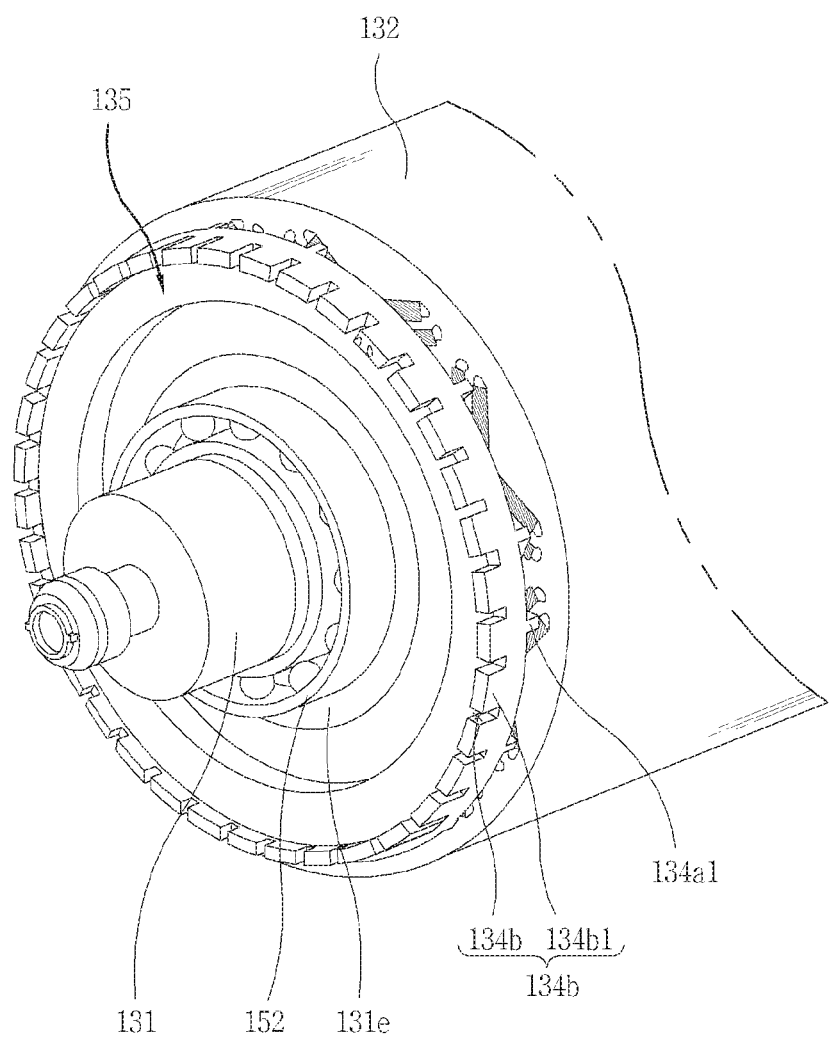
FIG. 11 is a perspective view showing a portion of a rear side of the rotor assembly.
Figure 12:
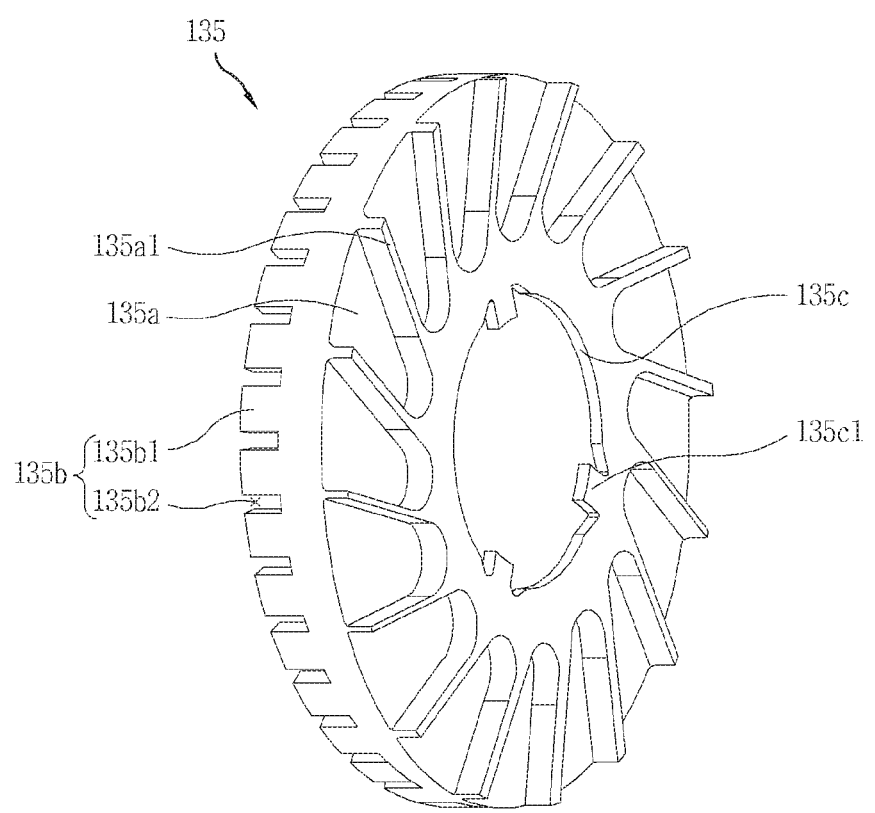
FIG. 12 is a perspective view of a front surface of a second end ring according to the present disclosure.
Figure 13:
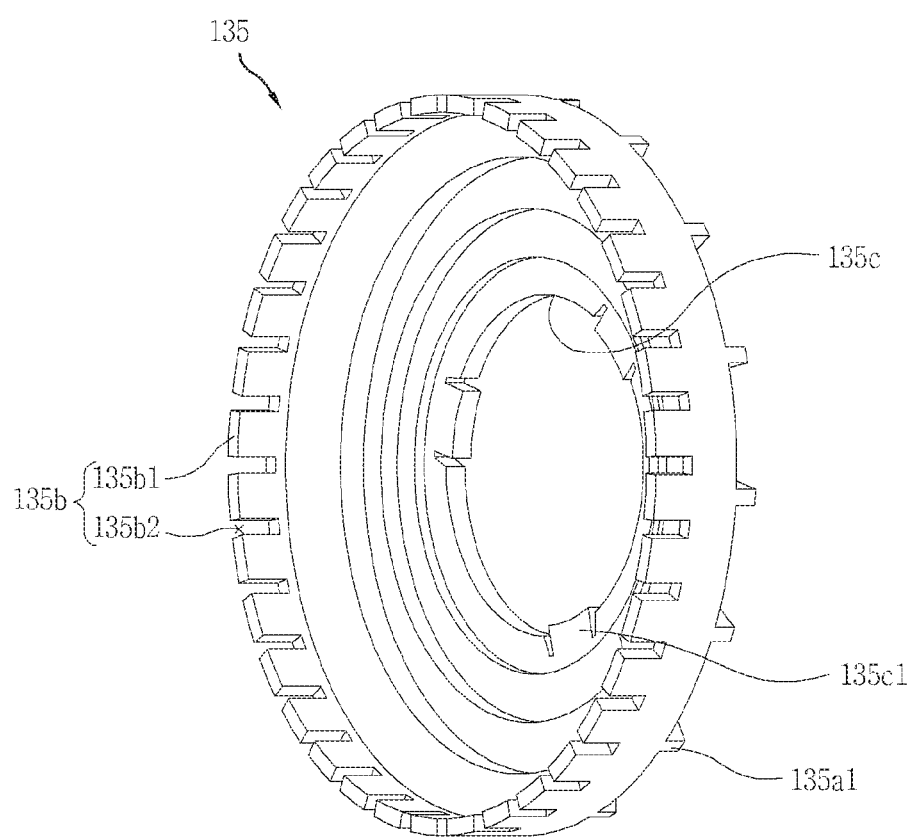
FIG. 13 is a perspective view illustrating a rear surface of the second end ring of FIG. 12.

FIG. 11 is a perspective view showing a portion of a rear side of the rotor assembly, FIG. 12 is a perspective view of a front surface of a second end ring according to the present disclosure, and FIG. 13 is a perspective view illustrating a rear surface of the second end ring of FIG. 12.

Referring to the drawings, the second end ring 135 is coupled to the rear side of the rotor core 132. More specifically, the second end ring 135 is formed to cover one rear side surface of the rotor core 132. That is, the second end ring 135 may be formed to have a generally circular cross-section to correspond to the cross-section of the rotor core 132 formed in a circular shape like the first end ring 134.

The second end ring 135 may be formed such that its diameter corresponds to the diameter of the rotor core 132. The second end ring 135 may include a front surface (or one surface) facing the other surface of the rotor core 132 and a rear surface (or the other surface) as an opposite surface.

A second oil guiding surface 135a may be formed on the front surface of the second end ring 135. The second oil guiding surface 135a may face the other surface of the rotor core 132 and may be spaced apart at a predetermined interval. In addition, the second oil guiding surface 135a may be formed in parallel with the other surface of the rotor core 132.

The second oil guiding surface 135a may include a blade 135a1 protruding from the second oil guiding surface 135a toward the rotor core 132. The blade 135a1 may be formed to extend in the radial direction of the second end ring 135. The blade 135a1 may be formed of a plurality of blades, and each blade may extend in a direction opposite to a rotation direction of the rotor assembly 130 toward the radially outer side from the center of the second end ring 135.

In addition, an end surface of the blade 135a1 may be in contact with the other surface of the rotor core 132. That is, the second oil guiding surface 135a may be spaced apart from the other surface of the rotor core 132 by an axial thickness of the blade 135a1.

By the blade 135a1, the oil supplied to the second oil guiding surface 135a through the plurality of holes 131b and 131c may be radially pushed out. Accordingly, radial movement of the oil may be accelerated. In addition, as the rotor assembly 130 rotates, a negative pressure is formed at a plurality of holes 131b and 131c by the blades 135a1, thereby accelerating axial movement of oil.

Meanwhile, a rear surface of the second end ring 135 may be formed to be stepped at least one or more times. A second scattering portion 135b may be formed on the rear surface of the second end ring 135. The second scattering portion 135b may be formed to radially scatter the oil supplied to the rear surface of the second end ring 135.

The second scattering portion 135b may include a second edge portion 135b1 and a second slit portion 135b2. The second edge portion 135b1 may protrude from the rear surface and may extend along the circumferential direction from the edge of the second end ring 135. In addition, the second slit portion 135b2 is recessed in the axial direction at the second edge portion 135b1 and may be formed in plural along the circumferential direction. By the second scattering portion 135b having such a structure, the oil supplied to the rear surface of the second end ring 135 may be evenly scattered in the circumferential direction.

Meanwhile, the second scattering portion 135b may overlap the second end turn 122b in the radial direction of the rotating shaft 131. In this case, the oil scattered in the radial direction by the second scattering portion 135b may be supplied to the second end turn 122b. Thus, heat of the first end turn 122b may be cooled. In addition, particles of the scattered oil may be atomized to collide with the first end turn 122b. As a result, at least part of the oil may absorb heat, while temporarily floating in the inside of the casing. Accordingly, overall cooling performance of the motor may be improved.

Meanwhile, the second end ring 135 includes a second rotating shaft fastening portion 135c. The second rotating shaft fastening portion 135c may be in a shape corresponding to the outer circumferential surface of the rotating shaft 131 and formed to penetrate through the second end ring 135. That is, the rotating shaft 131 may be inserted into and coupled to the second rotating shaft fastening portion 135c.

In addition, the second rotating shaft fastening portion 135c may include a second rotating shaft fastening protrusion 135c1. The second rotating shaft fastening protrusion 135c1 may be formed to protrude toward the rotating shaft 131 from the inner circumferential surface of the second rotating shaft fastening portion 135c. The second rotating shaft fastening protrusion 135c1 may be provided in plurality and spaced apart from each other along the circumferential direction. The second rotating shaft fastening protrusion 135c1 may be inserted into and coupled to the coupling recess 131b1. Accordingly, rotation with respect to the second end ring 135 and the rotating shaft 131 may be prevented.

Meanwhile, the second scattering portion 135b of the second end ring 135 may be provided to face the second shaft receiving portion 113a supporting the rotating shaft 131 and may be provided with oil from the second shaft receiving portion 113a.

Hereinafter, the second shaft receiving portion 113a will be described in detail.

The second shaft receiving portion 113a is formed to protrude toward the front side from the second cover 113 formed to cover the rear opening end of the main housing 111. In other words, the second shaft receiving portion 113a may be formed to protrude toward the rotor assembly 130 from the rear surface of the second cover 113. At least a portion of the rotating shaft 131 accommodated in the second rotating shaft accommodating space 113b may be radially supported by the second bearing 152 provided in the second rotating shaft accommodating space 113b.

Meanwhile, similarly to the first shaft receiving portion 112a, some of the plurality of oil inlets 111a1 may be formed to overlap the second shaft receiving portion 113a in the gravity direction, that is, the height direction D2 of the motor 100. In other words, the oil inlet 111a1 is located above the second shaft receiving portion 113a.

In addition, similarly to the first shaft receiving portion 112a, one surface of the second shaft receiving portion 113a facing the oil inlet 111a1 may be formed to be concave. In other words, the second shaft receiving portion 113a may include a second oil reservoir surface 113a1 that is concave on one surface of the first shaft receiving portion 113a facing the oil inlet. In this case, the oil dropped from the oil inlet 111a1 may temporarily stay on the second oil reservoir surface 113a1.

In addition, the second shaft receiving portion 113a may include a second oil inlet hole 113a2 formed to allow the second oil reservoir surface 113a1 and the second rotating shaft accommodating space 113b to communicate with each other. The second oil inlet hole 113a2 may be formed by penetrating through the second shaft receiving portion 113a in the height direction D2 of the motor on the upper side with respect to the rotating shaft 131.

Part of the oil staying on the second oil reservoir surface 113a1 may flow into the second rotating shaft accommodating space 113b by the second oil inlet hole 113a2. Accordingly, the second bearing 152 may not only maintain lubricity by oil but also cool heat generated in the second bearing 152 according to driving.

Figure 14:
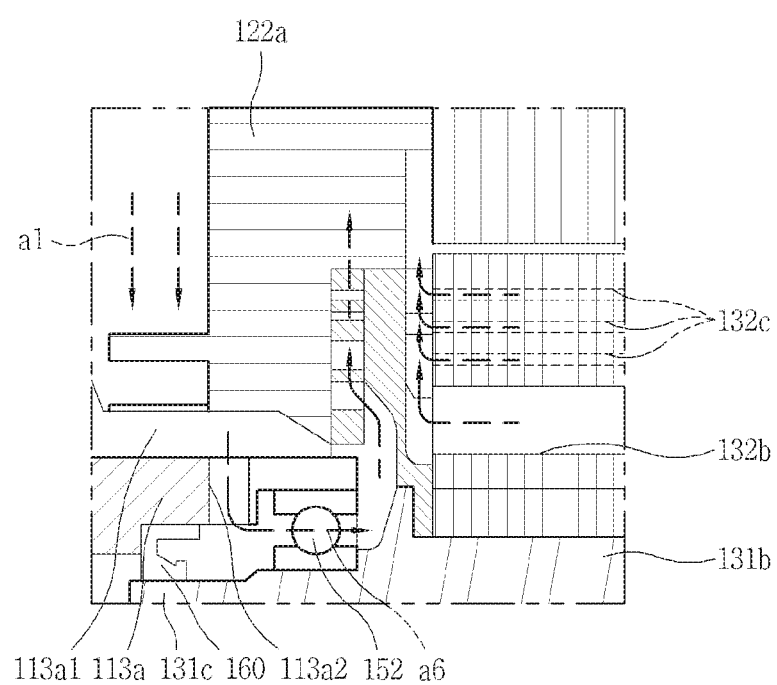
FIG. 14 is an enlarged view of C in FIG. 4.

FIG. 14 is an enlarged view of C in FIG. 4.

Referring to the drawing, the oil supplied to the second shaft receiving portion 113a and staying on the second oil reservoir surface 113a1 may be guided to the rear surface of the second end ring 135 along a sixth path a6.

The sixth path a6 is a path through which the oil staying on the second oil reservoir surface 112a1 flows into the second rotating shaft accommodating space 113b through the second oil inlet hole 113a2.

In the sixth path a6, at least part of the oil flowing into the second rotating shaft accommodating space 113b through the second oil inlet hole 113a2 may move in the axial direction from the upper side of the rotating shaft 131. In this case, at least part of the oil moving in the axial direction from the upper side of the rotating shaft 131 is in contact with the second bearing 152 and the other part thereof moves in the axial direction and the radial direction so as to be guided to the rear surface of the second end ring 135.

The oil guided to the rear surface of the second end ring 135 is moved in the radial direction. In this case, the oil may be scattered in the radial direction by the second scattering portion 135b.

Hereinafter, an air gap cooling structure of a motor according to another embodiment of the present disclosure will be described with reference to FIGS. 15 to 20.

Figure 15:
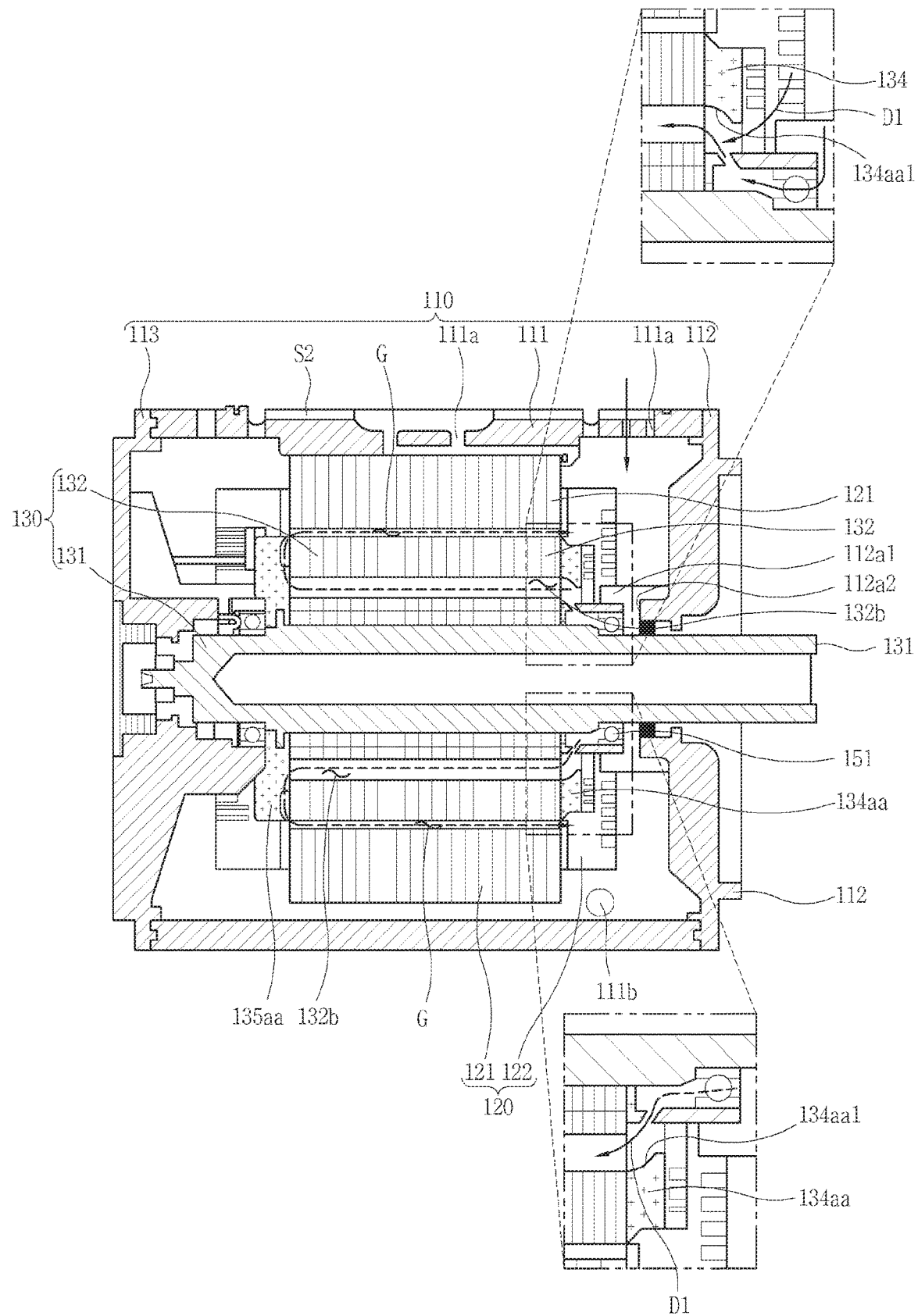
FIG. 15 is a cross-sectional view of a motor according to an embodiment of the present disclosure.
Figure 16:
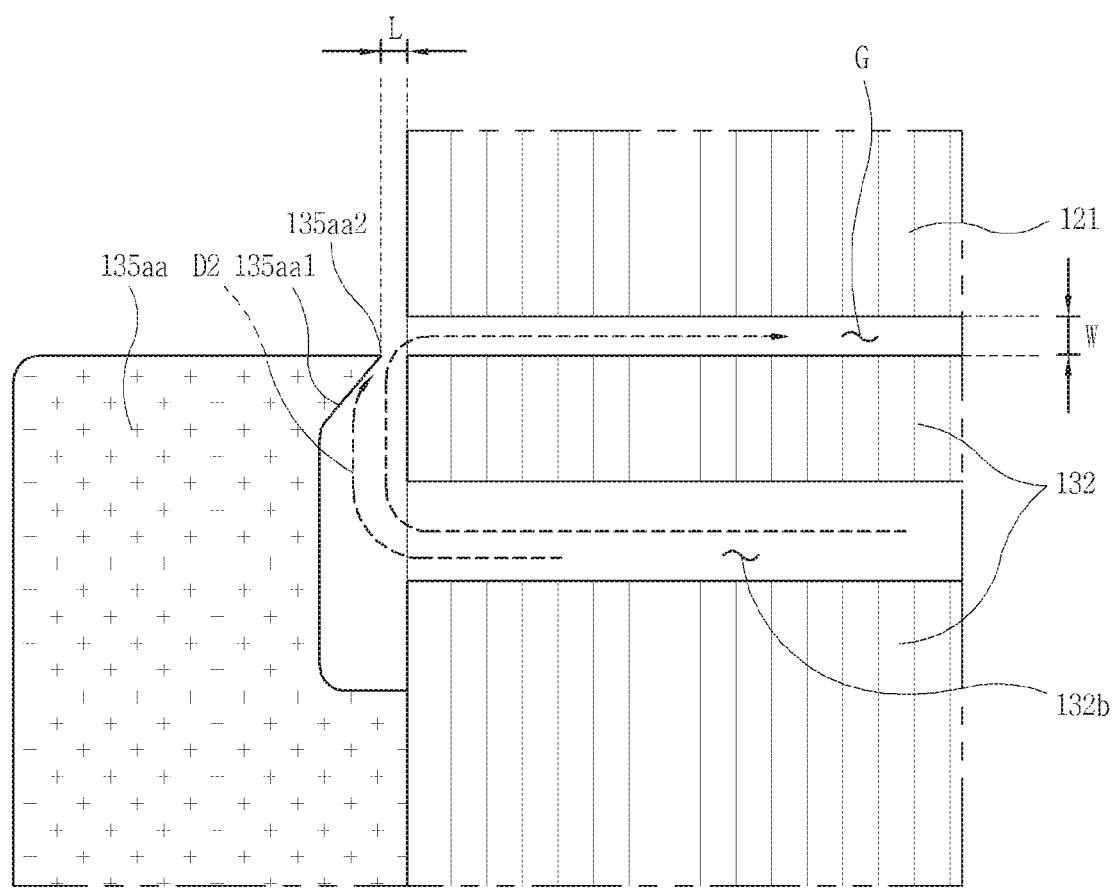
FIG. 16 is an enlarged view illustrating a main part of FIG. 15.
Figure 17:
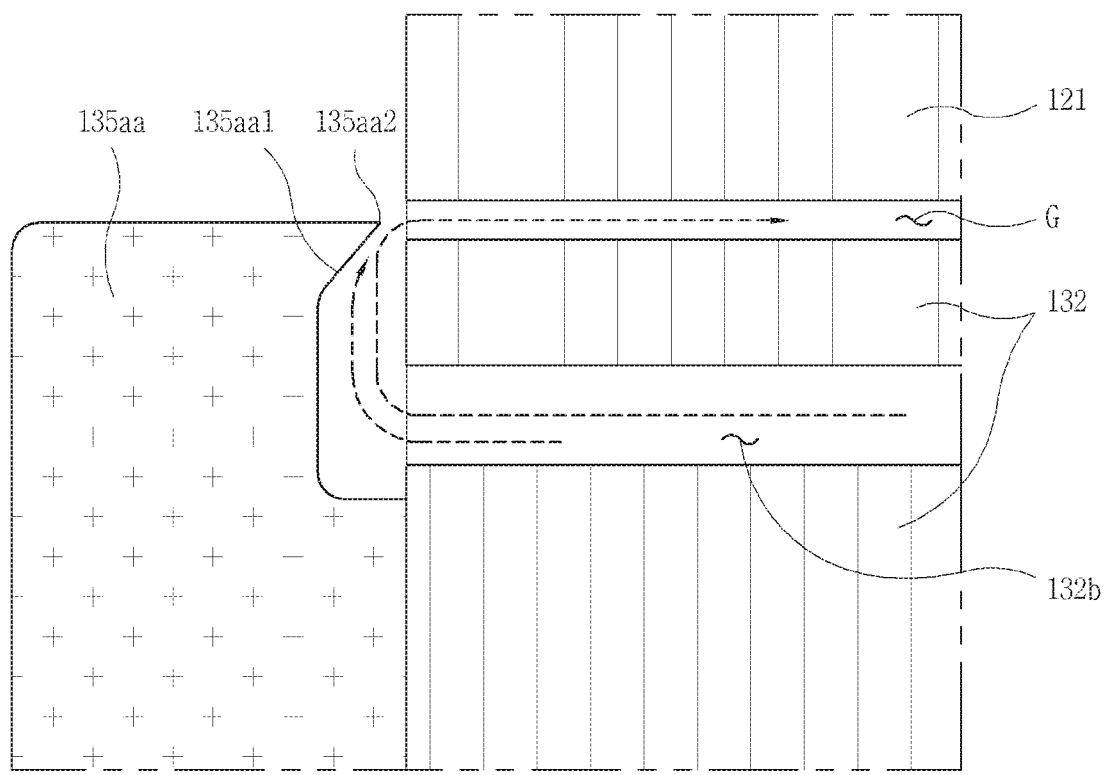
FIG. 17 is a partial cross-sectional view showing a state of a second oil guiding portion and an air gap of FIG. 15.

FIG. 15 is a cross-sectional view of a motor according to an embodiment of the present disclosure, FIG. 16 is an enlarged view illustrating a main part of FIG. 15, and FIG. 17 is a partial cross-sectional view showing a state of a second oil guiding portion and an air gap of FIG. 15. As shown in FIGS. 15 to 17, the air gap cooling structure for the oil-cooled motor according to an embodiment of the present disclosure may include a casing 110, a stator core 121, a rotor core 132, a first end ring 134aa, and a second end ring 135aa.

The casing 110 may be fixed to a fixed shaft (not shown) to form an appearance of the oil-cooled motor 100 and provide a storage space for receiving the stator core 121 and the rotor core 132.

The casing 110 may be formed of aluminum or the like having excellent thermal conductivity. The casing 110 may include a main housing 111, a first cover 112, and a second cover 113. The main housing 111 has a cylindrical shape with both sides opened. The first cover 112 is coupled to one end of the main housing 111 and the second cover 113 is coupled to the other end.

As described above with reference to FIGS. 2 and 3, the casing 110 is provided with an oil supply module 200 to allow the oil to circulate via the inside of the casing 110. The oil supply module 200 includes a pump 210, an oil reservoir 220, and an oil pipe 230. The casing 110 is provided with an oil supply unit 160. The oil supply unit 160 includes an oil supply reservoir S2 in which oil is stored and an oil supply flow path 111a formed to allow the oil supply reservoir S2 and the inside of the casing 110 to communicate with each other. The oil supply flow path 111a includes a plurality of oil inlets 111a1. The first shaft receiving portion 112a is formed at the first cover 112. A first oil reservoir surface 112a1 is formed at the first shaft receiving portion 112a. The oil flowing in through the oil inlet 111a1 and dropped may be temporarily stored on the first oil reservoir surface 112a1.

The first shaft receiving portion 112a is provided with a first oil inlet hole 113a2. As a result, a portion of the oil on the first oil reservoir surface 112a1 may be moved to the first bearing 151 to cool the first bearing 151.

The oil temporarily stored on the first oil reservoir surface 112a1 may be moved to the first end ring 134aa through a plurality of paths.

The stator 120 is provided inside the casing 110. The stator 120 includes a stator core 121 and a stator coil 122 wound around the stator core 121.

The stator core 121 may be formed by insulatedly stacking a plurality of electrical steel sheets having a plurality of slots and teeth.

The rotor assembly 130 is rotatably provided with a predetermined gap G inside the stator 120.

The rotor assembly 130 includes a rotating shaft 131 and a rotor core 132 rotated about the rotating shaft 131. The rotor core 132 is provided with a plurality of permanent magnets as described above.

The rotor core 132 may be rotated about the rotating shaft 131 by a magnetic interaction of the magnetic field formed by the stator coil 122 and the permanent magnet.

The rotor core 132 may be formed by insulatedly stacking of a plurality of circular electrical steel sheets.

The rotating shaft 131 may be coupled to the rotor core 132 in the axial direction in the casing 110 and may be positioned to penetrate through a central portion of the stator core 121.

An air gap G may be formed between the stator core 121 and the rotor core 132.

Since the air gap G is an air layer and has an insulating function to block heat generated from the stator core 121 and the rotor core 132 from being radiated to the outside, heat dissipation performance of the motor 100 may be lowered due to the air gap G.

In the related art, the height of the oil filled in the casing 110 is higher than or equal to the air gap G to cool the air gap G through the oil, thereby preventing a degradation of the heat dissipation performance due to the air gap. However, since the amount of oil filled in the casing 110 is large, driving efficiency of the motor 100 is lowered due to oil drag torque generated when the rotor core 132 rotates.

However, according to the present disclosure, oil filled in the casing 110 flows to the air gap G after passing through the rotor core 132 by using the first end ring 134*aa*, the oil movement hole 132*b*, and the second end ring 135*aa*, whereby the air gap G is cooled by the oil, while the oil is maintained to be equal to or lower than the height of the air gap G in the housing 100, thereby preventing driving efficiency of the motor 100 from being lowered due to the use of an unnecessarily large amount of oil for cooling the air gap G.

Meanwhile, an oil movement hole 132*b* may be formed at the rotor core 132.

The oil movement hole 132*b* is formed to penetrate in the axial direction of the rotor core 132. When the oil filled in the casing 110 flows to the rotor core 132 after passing through the first end ring 134*aa*, a flow path may be provided for the oil to move toward the second end ring 135*aa*.

The first end ring 134*aa* may be provided on one side of the rotor core 132 to support the rotor core 132.

A first oil guiding portion 134*aa*1 may be formed at the first end ring 134*aa*.

The first oil guiding portion 134*aa*1 is formed along an inner circumferential surface of the first end ring 134*aa*, and when the rotor core 132 rotates, the oil filled in the casing 110 may be guided to flow into the oil movement hole 132*b* side D1.

Here, the first oil guiding portion 134*aa*1 may be formed to be rounded or inclined toward the oil movement hole 132*b*.

In the present embodiment, the case where the first oil guiding portion 134*aa*1 is formed to be inclined or rounded is illustrated but the present disclosure is not limited thereto, and the first oil guiding portion 134*aa*1 may be formed in various shapes to allow the oil to smoothly flow into the oil movement hole 132*b*.

For example, an inclination angle of the first oil guiding portion 134*aa*1 may be configured differently to accelerate inflow of the oil into the oil movement hole 132*b*.

The second end ring 135*aa* may be located on the other side of the rotor core 132 and may compressively support the rotor core 132 together with the first end ring 134*aa* from both sides.

In this case, a second oil guiding portion 135*aa*1 may be formed at the second end ring 135*aa*.

The second oil guiding portion 135*aa*1 is formed along an inner circumferential surface of the second end ring 135*aa*. When the oil passes through the oil movement hole 132*b* and then flows into the second end ring 135*aa*, the oil flows into the air gap G, while a flow direction of the oil to the air gap G side D2 is controlled by the second oil guiding portion 135*aa*1.

Here, the second oil guiding portion 135*aa*1 may be formed to be rounded or inclined toward the air gap G side, through which the oil flowing into the second end ring 135*aa* may smoothly flow to the air gap G side after passing through the second oil guiding portion 135*aa*1.

In the present embodiment, the case where the second oil guiding portion 135*aa*1 is formed to be inclined or rounded is illustrated but the present disclosure is not limited thereto, and the second oil guiding portion 135*aa*1 may be formed in various shapes to allow the oil to smoothly flow into the air gap G.

For example, an inclination angle of the second oil guiding portion 135*aa*1 may be configured differently to accelerate inflow of the oil into the air gap G side.

Meanwhile, at least a portion of the second oil guiding portion 135*aa*1 may be face the air gap G.

Since the at least a portion of the second oil guiding portion 135*aa*1 is disposed to face the air gap G, the second oil guiding portion 135*aa*1 may be positioned to be higher than the air gap G with respect to the axial direction of the rotor core 132, thereby preventing a reduction in the amount of the oil flowing into the air gap G side.

For example, if the second oil guiding portion 135*aa*1 is not positioned to face the air gap G, the second oil guiding portion 135*aa*1 may be always positioned to be lower than the air gap G based on the axial direction of the rotor core 132. In this case, the oil passing through the second oil guiding portion 135*aa*1 must move by a certain distance before entering the air gap G, and when the oil moves, the oil is discharged into the space between the second oil guiding portion 135*aa*1 and the stator core 121.

Therefore, the amount of the oil flowing into the air gap G side is relatively reduced, so that a cooling rate for the air gap G is reduced.

On the contrary, when at least a portion of the second oil guiding portion 135*aa*1 is positioned to face the air gap G, the second oil guiding portion 135*aa*1 is always positioned to be higher than the air gap G based on the axial direction of the rotor core 132. According to this configuration, when the oil flows into the air gap G side after passing through the second oil guiding portion 135*aa*1, the amount of oil discharged to the space between the second oil guiding portion 135*aa*1 and the stator core 121 is reduced, thereby suppressing a reduction in the amount of the oil flowing into the air gap G side.

Therefore, in the present disclosure, at least a portion of the second oil guiding portion 135*aa*1 is positioned to face the air gap G, so that at least a portion of the second oil guiding portion 135*aa*1 is always positioned to be higher than the air gap G based on the axial direction of the rotor core 132, thereby reducing the amount of oil discharged through the space between the second oil guiding portion 135*aa*1 and the stator core 121 and increasing the amount of oil flowing into the air gap G side. As a result, a cooling rate of the air gap G (the outer surface of the rotor core 132 and the inner surface of the stator core 121) may be increased.

Meanwhile, the end portion 135*aa*2 of the second oil guiding portion 135*aa*1 and the rotor core 132 may be formed to be spaced apart from each other.

A space is formed between the end portion 135*aa*2 and the rotor core 132. As a result, the oil flowing into the second end ring 135*aa* may flow into the air gap G through the space. In addition, the end portion 135*aa*2 is spaced apart from the stator core 121 at a predetermined distance. As a result, the occurrence of damage due to mutual contact between the second end ring 135*aa* and the stator core 121 when the rotor core 132 is rotated may be suppressed. Here, a distance L between the end portion 135*aa*2 of the second oil guiding portion 135*aa*1 and the rotor core 132 may be formed to be equal to or less than a width W of the air gap G.

Since the distance L between the end portion 135*aa*2 and the rotor core 132 is formed to be equal to or less than the width W of the air gap G, the oil discharged through the space between the end portion 135*aa*2 and the rotor core 132 may smoothly flow into the air gap G, while preventing damage caused by friction between the end portion 135aa2 and the stator core 121, thereby minimizing the amount of oil leakage to the outside of the air gap G.

Figure 18:
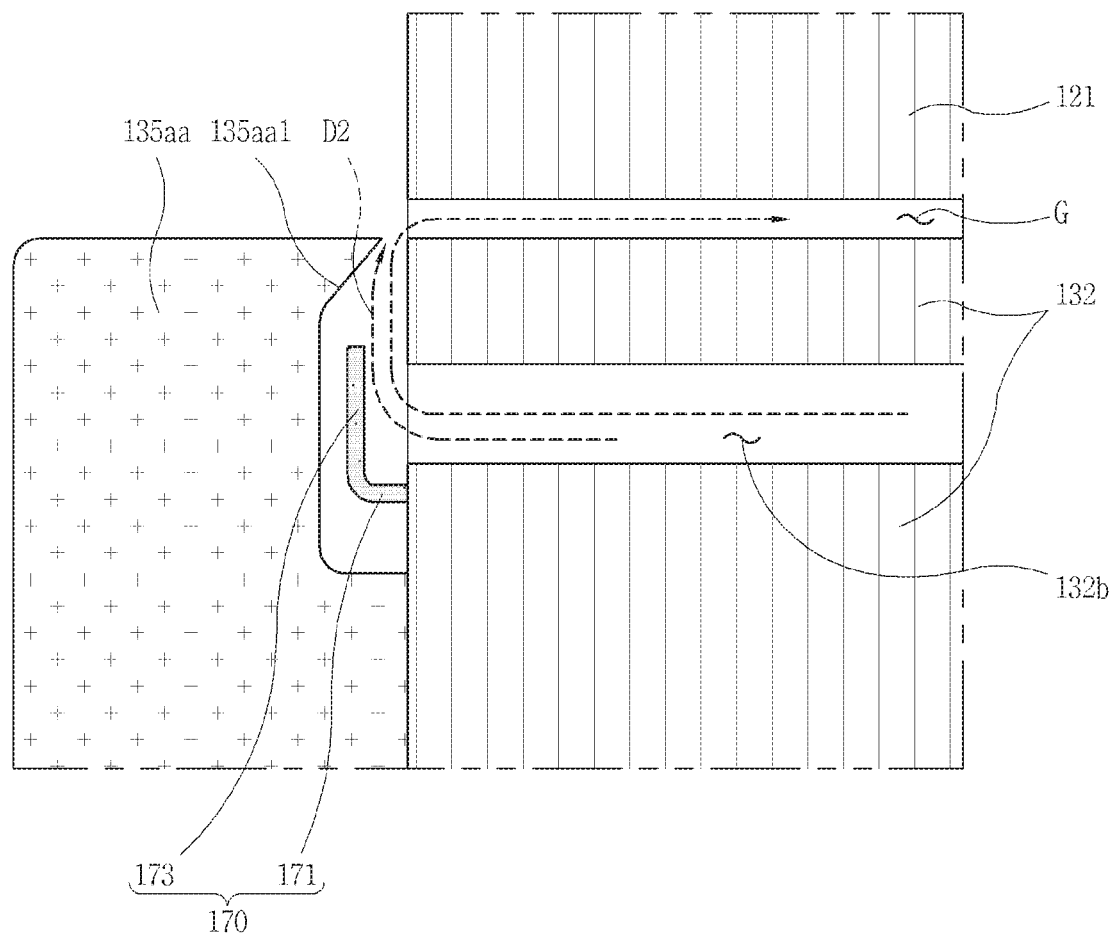
FIG. 18 is a partial cross-sectional view showing a state where a movement limiting portion is provided at a second oil guiding portion of the motor of FIG. 15.
Figure 19:
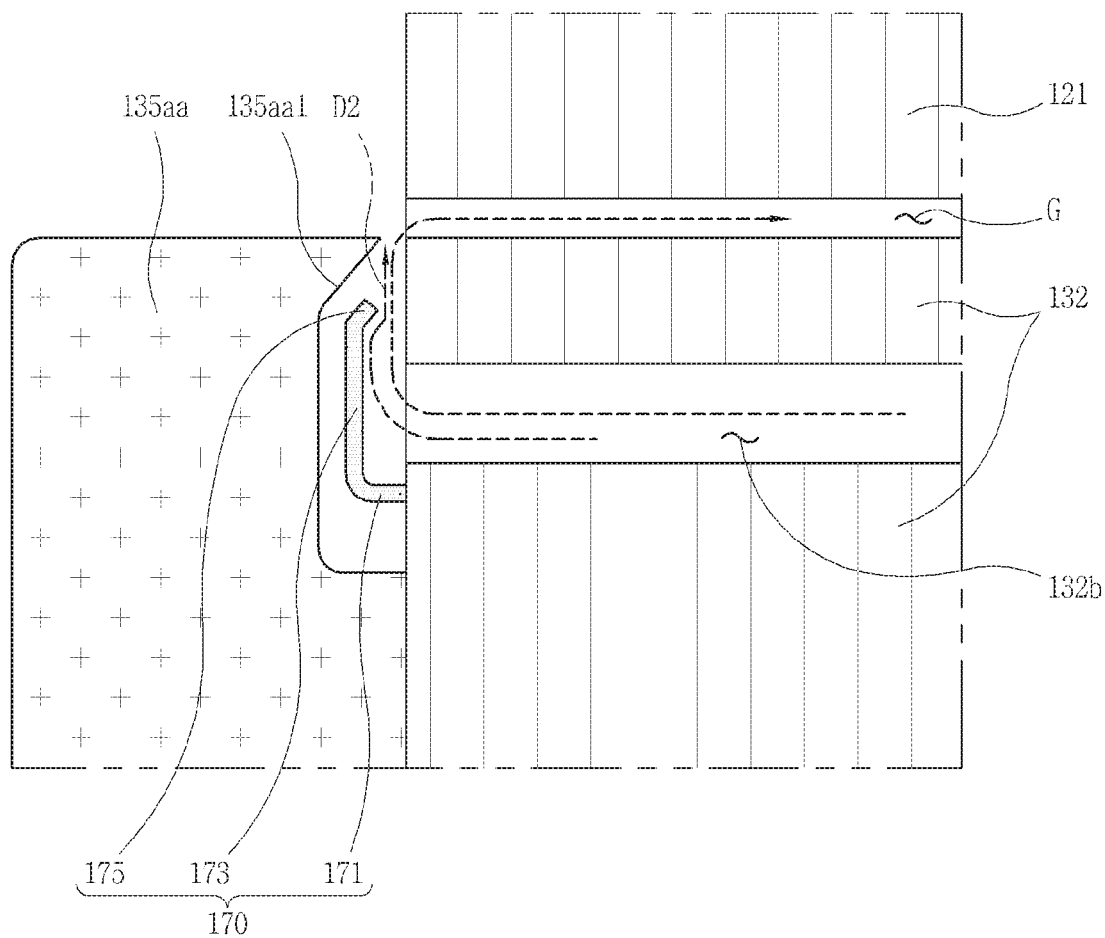
FIG. 19 is a partial cross-sectional view showing a state where an inclined portion is formed in the movement limiting portion of FIG. 15.

FIG. 18 is a partial cross-sectional view showing a state where a movement limiting portion is provided at a second oil guiding portion of the motor of FIG. 15, and FIG. 19 is a partial cross-sectional view showing a state where an inclined portion is formed in the movement limiting portion of FIG. 15. As illustrated in FIGS. 18 and 19, an air gap cooling structure for an oil-cooled motor according to an embodiment of the present disclosure may further include a movement limiting portion 170.

The movement limiting portion 170 may be formed on one surface of the rotor core 132 facing the second end ring 135aa.

The movement limiting portion 170 may restrict movement of the oil, which has moved to the second end ring 135aa through the oil movement hole 132b, in the opposite direction of the second end ring 135aa1.

Here, the movement limiting portion 170 may include a protrusion 171 and a guiding portion 173.

The protrusion 171 is formed to protrude toward the second end ring 135aa from one surface of the rotor core 132 and may limit movement of the oil passing through the oil movement hole 132b in the opposite direction of the second oil guiding portion 135aa1.

The guiding portion 173 may extend from one end of the protrusion 171 toward the second oil guiding portion 135aa1 to guide the oil to move toward the second oil guiding portion 135aa1.

In this case, an inclined portion 175 may be further formed at one end of the guiding portion 173 to be inclined toward the air gap G side.

The inclined portion 175 may adjust a movement direction of the oil, which has moved to the air gap G side through the protrusion 171 and the guiding portion 173 after passing through the oil movement hole 132b, to the air gap G side.

Figure 20:
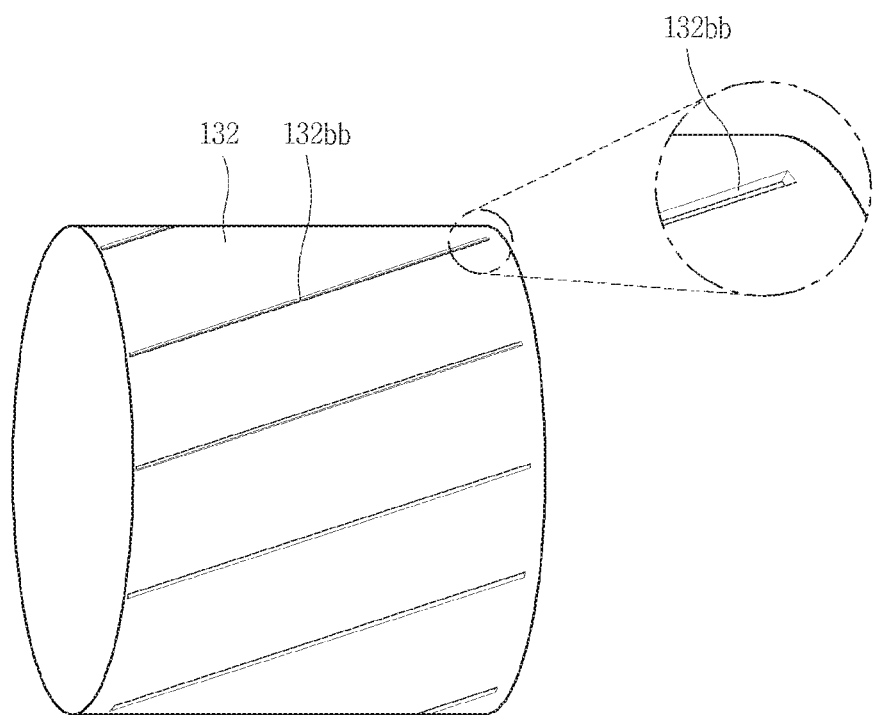
FIG. 20 is a perspective view illustrating a state where a movement accelerating portion is formed on an outer circumferential surface of a rotor core of the motor of FIG. 15.

FIG. 20 is a perspective view illustrating a state where a movement accelerating portion is formed on an outer circumferential surface of a rotor core of the motor of FIG. 15. As shown in FIG. 20, a movement accelerating portion 130b may be formed on an outer circumferential surface of the rotor core 132.

One or more movement accelerating portions 130b may be formed on the outer circumferential surface of the rotor core 132 along the axial direction of the rotor core 132.

When the oil is guided toward the air gap G through the second oil guiding portion 135aa1 and thereafter moved in the axial direction of the rotor core 132 along the air gap G, the movement accelerating portion 130b may increase a movement rate of the oil, thus increasing a cooling rate of the air gap G.

Here, the movement accelerating portion 130b may be formed in a slot shape. The movement accelerating portion 130b may be formed to be recessed along a radial direction and extend in the axial direction, for example, on the outer circumferential surface of the rotor core 132.

The movement accelerating portion 130b is formed in a slot shape to increase a movement space for the oil to move when the oil passes through the air gap G, thereby increasing the movement rate of the oil to increase a cooling rate of the air gap G.

In the present embodiment, a state where one slot is formed in plurality along the outer circumferential surface of the rotor core 132 in the axial direction of the rotor core 132 is illustrated, but is not limited thereto. For example, a plurality of slots may be spaced apart from each other in the axial direction of the rotor core 132.

The movement accelerating portion 130b may be inclined with respect to the axial direction of the rotor core 132.

By inclining the movement accelerating portion 130b with respect to the axial direction of the rotor core 132, the movement rate of the oil passing through the air gap G may be increased.

Hereinafter, a process of cooling the air gap G through the air gap cooling structure according to an embodiment of the present disclosure will be described in detail with reference to FIGS. 15 and 16.

First, when the rotor core 132 rotates about the rotating shaft 131 by the magnetic field interacting between the stator core 121 and the rotor core 132, the oil inside the casing 110 is moved to the first end ring 134aa.

The oil moved to the inside of the first end ring 134aa may be moved along the first oil guiding portion 134aa1 by a centrifugal force generated when the first end ring 134aa rotates and may be changed in a movement direction to the inside of the oil movement hole 132b. The oil flowing into the oil movement hole 132b is moved along the oil movement hole 132b and flows into the second end ring 135aa.

The oil flowing into the second end ring 135aa may be changed in a movement direction toward the air gap G by the second oil guiding portion 135aa1. The oil flowing into the air gap G cools the outer surface of the rotor core 132 and the inner surface of the stator core 121, while moving along the air gap G. As a result, a heat insulation phenomenon due to the air gap G is suppressed, and thus cooling efficiency of the motor 100 may be improved. According to the present disclosure configured as described above, the oil movement hole 132b is formed to penetrate through the rotor core 132 in the axial direction, the first oil guiding portion 134aa1 is formed on the inner circumferential surface of the first end ring 134aa, and the second oil guiding portion 135aa1 is formed on the inner circumferential surface of the second end ring 135aa, whereby the oil supplied into the casing 110 through the first oil guiding portion 134aa1, the oil movement hole 132b, and the second oil guiding portion 135aa1 may smoothly flow into the rotor core 132 to cool the center of the rotor core 132, and the oil which has cooled the rotor core 132 is moved toward the air gap G to cool the air gap G.

In addition, since the oil supplied into the casing 110 flows into the air gap G through the first oil guiding portion 134aa1, the second oil guiding portion 135aa1, and the oil movement hole 132b to cool the center of the rotor core and the air gap G (the outer surface of the rotor core 132 and the inner surface of the stator core 121), it is not necessary to fill the oil beyond the air gap G in the casing 110. Therefore, the influence of oil drag torque caused by the oil overfilled in the casing 110 may be reduced. In addition, by allowing the first oil guiding portion 134aa1 or the second oil guiding portion 135aa1 to be inclined or rounded, the oil may smoothly flow into the rotor core 132 side through the first oil guiding portion 134aa1 or may smoothly flow into the air gap G side through the second oil guiding portion 135aa1.

In addition, by positioning at least a portion of the second oil guiding portion 135aa1 to face the air gap G, the second oil guiding portion 135aa1 is always positioned to be higher than the air gap G, thereby preventing a reduction in the amount of oil entering the air gap G.

In addition, by providing the movement limiting portion 170 on one surface of the rotor core 132, the amount and the flow rate of the oil flowing into the air gap G side through the second oil guide 135aa1 are increased.

In addition, by forming the slot-shaped movement accelerating portion 130b on the outer circumferential surface of the rotor core 132, when the oil flowing into the air gap G side through the second oil guiding portion 135aa1 passes through the air gap G is increased in a movement rate, thereby increasing a cooling rate for the air gap G.

In addition, by forming the movement accelerating portion 130b to be inclined with respect to the axial direction of the rotor core 132, a movement rate of the oil passing through the air gap G may be increased.

In addition, since the end portion 135aa2 of the second oil guiding portion 135aa1 and the rotor core 132 are positioned to be spaced apart from each other, the space into which the oil may flow into the air gap G from the inside of the second end ring 135aa may be secured and damage due to friction with the stator core 121 may be suppressed. In addition, since the distance between the end portion 135aa2 of the second oil guiding portion 135aa1 and the rotor core 132 is equal to or less than the width of the air gap G, the oil discharged between the second oil guiding portion 135aa1 and the rotor core 132 may smoothly flow into the air gap G, thereby minimizing the amount of oil leaked to the outside of the air gap G.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A motor comprising:
a casing;
a stator fixed to an inner circumferential surface of the casing; and
a rotor assembly coupled to the stator with a predetermined air gap defined between the rotor assembly and the stator, the rotor assembly being configured to be rotatable relative to the stator based on a magnetic interaction between the rotor assembly and the stator,
wherein the rotor assembly comprises:
a rotatable shaft;
a rotor core coupled to the rotatable shaft, the rotor core including a plurality of holes penetrating through the rotor core in an axial direction;
a first end ring coupled to one end of the rotor core, the first end ring being configured to guide oil supplied to the rotor assembly to the plurality of holes; and
a second end ring coupled to the opposite end of the rotor core, the second end ring being configured to guide the oil passing through the plurality of holes in a radial direction,
wherein the casing comprises:
a main housing accommodating the stator and the rotor assembly;
a first cover covering one end of the main housing and supporting one side of the rotor assembly; and
a second cover covering the opposite end of the main housing and supporting the opposite side of the rotor assembly, and
an oil inlet defined through the main housing in a position overlapping the rotor assembly in a gravity direction and configured to guide the oil passing through the oil inlet and dropping onto the rotor assembly, and
wherein the stator comprises:
a stator core coupled to an inner circumferential surface of the main housing; and
a coil portion wound around the stator core and including first and second end turns respectively protruding from a first surface and a second, opposite surface of the stator core, and
the first end ring comprises a first scattering portion configured to scatter oil supplied to a surface of the first end ring opposite to one surface of the first end ring facing the rotor assembly, in the radial direction, and
the first scattering portion overlaps the first end turn in the radial direction of the rotating shaft.

2. The motor of claim 1, wherein
the first end ring and the second end ring each have first and second oil guiding surfaces configured for guiding the oil, respectively, and
the first and second oil guiding surfaces being spaced apart from and facing the plurality of holes, and extending in a direction perpendicular to an axial direction of the rotatable shaft.

3. The motor of claim 2, wherein
the plurality of holes comprise:
a first hole adjacent to the rotatable shaft; and
a second hole accommodating a magnetic member and spaced apart from the first hole in the radial direction, and
the first oil guiding surface comprises:
a first guiding surface facing the first hole; and
a second guiding surface extending in the radial direction from the first guiding surface and configured to guide the oil to the second hole.

4. The motor of claim 2, wherein
the second end ring comprises a blade protruding from the second oil guiding surface toward the rotor core and configured to accelerate radial movement of the oil so that a negative pressure is formed in the plurality of holes.

5. The motor of claim 1, wherein
the first cover comprises an oil guide protrusion protruding from one surface of the first cover facing the rotor core in a direction toward the first end ring and configured to guide the oil supplied into the main housing from an upper side of the main housing with respect to the gravity direction to the first oil guiding surface.

6. The motor of claim 5, wherein
the first cover comprises:
a first shaft receiving portion protruding from one surface of the first cover facing the rotor assembly, the first shaft receiving portion forming a first rotatable shaft accommodating space configured to accommodate at least a portion of one side of the rotatable shaft; and
a first bearing member disposed in the first rotatable shaft accommodating space and supporting in a radial direction one side of the rotatable shaft, and a first oil inlet hole defined in an upper portion of the first shaft receiving portion with respect to the rotatable shaft and penetrating through the first shaft receiving portion and configured such that at least a portion of the oil passing through the oil inlet and dropping onto the rotor assembly flows into the first rotatable shaft accommodating space.

7. The motor of claim 6, wherein
the oil guide protrusion comprises:
a first oil guide protrusion configured to be inclined in an upper direction with respect to the rotatable shaft and configured to guide at least a portion of the oil passing through the oil inlet and dropping onto the rotor assembly to the first end ring; and
a second oil guide protrusion extending along a lower side of the rotatable shaft and configured to surround at least a portion of the rotor to guide another portion of the oil to the first end ring.

8. The motor of claim 7, wherein
the first shaft receiving portion comprises a first oil reservoir surface configured to be concave on one surface of the first shaft receiving portion facing the oil inlet, and the first oil inlet hole is defined through the first oil reservoir surface.

9. The motor of claim 7, wherein
the second oil guide protrusion includes an inclined surface inclined with respect to the axial direction.

10. The motor of claim 1, wherein
the stator comprises:
a stator core coupled to an inner circumferential surface of the main housing; and
a coil portion wound around the stator core and including first and second end turns respectively protruding from a first end surface and a second, opposite end surface of the stator core,
wherein an oil guiding surface overlaps the second end turn in a radial direction of the rotatable shaft.

11. The motor of claim 1, wherein
the first scattering portion comprises:
a first edge portion protruding from the surface of the first end ring opposite from the one surface facing the rotor assembly and extending along a circumferential direction from an edge of the first end ring; and
a plurality of first slit portions recessed from the first edge portion in the axial direction and spaced along the circumferential direction.

12. The motor of claim 1, wherein
the stator comprises:
a stator core coupled to an inner circumferential surface of the main housing; and
a winding coil portion wound around the stator core and including first and second end turns protruding from a first surface and a second, opposite surface of the stator core,
wherein the second cover comprises:
a second shaft receiving portion protruding from a first surface of the second cover facing the rotor assembly to form a second rotating shaft accommodating space accommodating at least a portion of a side of the rotating shaft; and
first and second bearing members disposed in the second rotating shaft accommodating space and supporting at least one side of the rotatable shaft in a radial direction, and
a second oil inlet hole is defined at an upper portion of the second shaft receiving portion with respect to the rotatable shaft and penetrating through the second shaft receiving portion so that at least a portion of the oil flows into the second rotating shaft accommodating space.

13. The motor of claim 1, wherein
the plurality of holes comprise an oil movement hole penetrating through the rotor core in the axial direction,
the first end ring includes a first oil guiding portion configured to guide the oil to the oil movement hole, and
the second end ring includes a second oil guiding portion configured to guide the oil passing through the oil movement hole to the air gap.

14. The motor of claim 13, wherein
the first oil guiding portion is rounded or inclined toward the oil movement hole.

15. The motor of claim 13, wherein
the second oil guiding portion is rounded or inclined toward the air gap.

16. The motor of claim 15, wherein
at least a portion of the second oil guiding portion faces the air gap.

17. The motor of claim 13, wherein
an outer circumferential surface of the rotor core includes at least one movement accelerating portion configured to accelerate movement of the oil passing through the air gap in the axial direction of the rotor core.

18. The motor of claim 17, wherein
the movement accelerating portion is a slot inclined with respect to the axial direction of the rotor core.

* * * * *